(12) United States Patent
Eberle et al.

(10) Patent No.: US 11,770,215 B2
(45) Date of Patent: Sep. 26, 2023

(54) TRANSCEIVER SYSTEM WITH END-TO-END RELIABILITY AND ORDERING PROTOCOLS

(71) Applicant: NVIDIA Corp., Santa Clara, CA (US)

(72) Inventors: Hans Eberle, Mountain View, CA (US); Larry Robert Dennison, Mendon, MA (US); John Martin Snyder, San Rafael, CA (US)

(73) Assignee: NVIDIA CORP., Santa Clara, CA (US)

( * ) Notice: Subject to any disclaimer, the term of this patent is extended or adjusted under 35 U.S.C. 154(b) by 0 days.

(21) Appl. No.: 17/674,167

(22) Filed: Feb. 17, 2022

(65) Prior Publication Data

US 2023/0261794 A1 Aug. 17, 2023

(51) Int. Cl.
*H04L 1/1607* (2023.01)
*H04L 1/1829* (2023.01)

(52) U.S. Cl.
CPC .......... *H04L 1/1628* (2013.01); *H04L 1/1642* (2013.01); *H04L 1/1835* (2013.01)

(58) Field of Classification Search
CPC .... H04L 1/1628; H04L 1/1642; H04L 1/1835
USPC ........................................ 714/748, 749, 750
See application file for complete search history.

(56) References Cited

U.S. PATENT DOCUMENTS

| 7,389,462 | B1 | 6/2008 | Wang et al. |
| 9,495,231 | B2 | 11/2016 | Gilda et al. |
| 10,581,645 | B1 | 3/2020 | Song et al. |
| 10,820,057 | B2 | 10/2020 | Eberle et al. |
| 11,108,704 | B2 | 8/2021 | Blumrich et al. |
| 2003/0088694 | A1 | 5/2003 | Patek et al. |
| 2004/0215810 | A1 | 10/2004 | Tan et al. |
| 2005/0083921 | A1 | 4/2005 | McDermott et al. |
| 2008/0084825 | A1* | 4/2008 | Lee ........................ H04L 1/1838 370/236 |
| 2008/0084873 | A1 | 4/2008 | Pullen et al. |
| 2008/0151841 | A1 | 6/2008 | Yi et al. |
| 2009/0168723 | A1 | 7/2009 | Meylan |
| 2011/0131654 | A1 | 6/2011 | Taneja et al. |
| 2011/0302383 | A1 | 12/2011 | Ignatius et al. |
| 2012/0117605 | A1 | 5/2012 | Miao et al. |
| 2013/0028083 | A1 | 1/2013 | Yoshida et al. |
| 2013/0142066 | A1 | 6/2013 | Yamaguchi et al. |
| 2013/0343388 | A1 | 12/2013 | Stroud et al. |

(Continued)

FOREIGN PATENT DOCUMENTS

JP   5863076 B2   2/2016

OTHER PUBLICATIONS

NPL_German PTO Office Action_1020191/298,997_08092022.

(Continued)

*Primary Examiner* — Albert Decady
*Assistant Examiner* — Osman M Alshack
(74) *Attorney, Agent, or Firm* — Rowan TELS LLC

(57) ABSTRACT

Packet flows between a transmitter and a receiver in an unreliable and unordered switched packet network may be established as a result of receiving a second packet comprising a second memory operation on a memory address. The transmission of memory load command packets followed by memory store command packets in the packet flow may be serialized, and a synchronization operation may be executed between the transmitter and the receiver when a packet count at the receiver satisfies a number of data packets in the packet flow.

22 Claims, 31 Drawing Sheets

(56) References Cited

U.S. PATENT DOCUMENTS

| | | |
|---|---|---|
| 2014/0310405 A1 | 10/2014 | Pope et al. |
| 2014/0321471 A1 | 10/2014 | Lau et al. |
| 2014/0351239 A1 | 11/2014 | Davis et al. |
| 2015/0067067 A1* | 3/2015 | Archer .................... G06F 9/546 709/206 |
| 2016/0142936 A1* | 5/2016 | Bressanelli ............. H04L 12/00 370/242 |
| 2016/0188398 A1 | 6/2016 | Gilda et al. |
| 2016/0191672 A1 | 6/2016 | Perlman |
| 2016/0345219 A1 | 11/2016 | Brisebois et al. |
| 2017/0026289 A1 | 1/2017 | Vinsel et al. |
| 2018/0004705 A1* | 1/2018 | Menachem ......... H04L 67/1097 |
| 2018/0307485 A1 | 10/2018 | Appu et al. |
| 2018/0308272 A1 | 10/2018 | Appu et al. |
| 2019/0304055 A1 | 10/2019 | Vembu et al. |
| 2020/0053002 A1 | 2/2020 | Heidelberger et al. |
| 2020/0145725 A1* | 5/2020 | Eberle ................ H04N 21/2387 |
| 2020/0151289 A1 | 5/2020 | Sikka et al. |
| 2020/0177521 A1 | 6/2020 | Blumrich et al. |
| 2020/0210276 A1 | 7/2020 | Sullivan et al. |
| 2020/0344143 A1 | 10/2020 | Faseela et al. |
| 2020/0374593 A1* | 11/2020 | Eberle ................ H04N 21/4302 |
| 2020/0374594 A1* | 11/2020 | Eberle ................ H04N 21/4302 |
| 2020/0412835 A1 | 12/2020 | Xu et al. |
| 2021/0119930 A1* | 4/2021 | Debbage ................ H04L 1/1642 |
| 2021/0297350 A1* | 9/2021 | Vegesna .................. H04L 47/12 |
| 2021/0344616 A1 | 11/2021 | Blumrich et al. |
| 2022/0085916 A1* | 3/2022 | Debbage ................ H04L 1/1635 |
| 2022/0095017 A1* | 3/2022 | Eberle ................ H04N 21/4302 |
| 2022/0158772 A1* | 5/2022 | Burstein ........... G06F 15/17331 |
| 2022/0210054 A1* | 6/2022 | Beecroft ............... H04L 45/028 |

OTHER PUBLICATIONS

U.S. Appl. No. 17/377,943, filed Jul. 16, 2021, Matthias Augustin Blumrich.

H. Eberle and L. Dennison, "Light-Weight Protocols for Wire-Speed Ordering," in High Performance Computing, Networking, Storage and Analysis, 2018. SC 2018. International Conference for. IEEE, 2018, pp. 1-12.

* cited by examiner

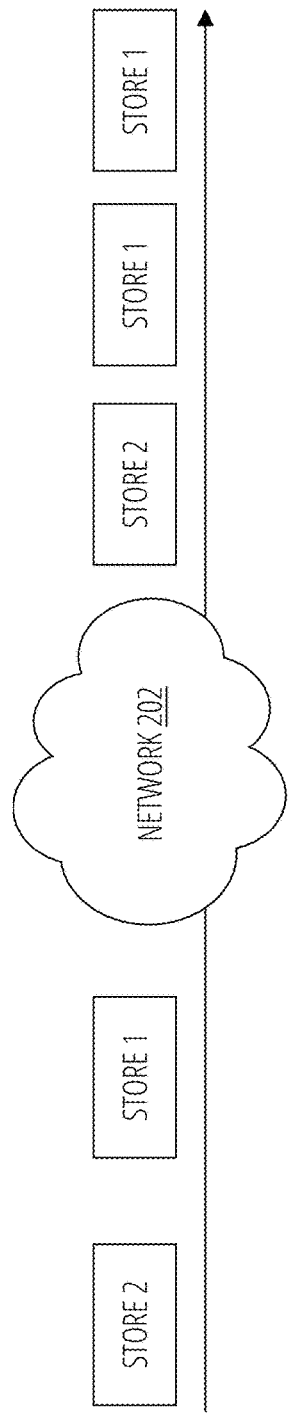
FIG. 2
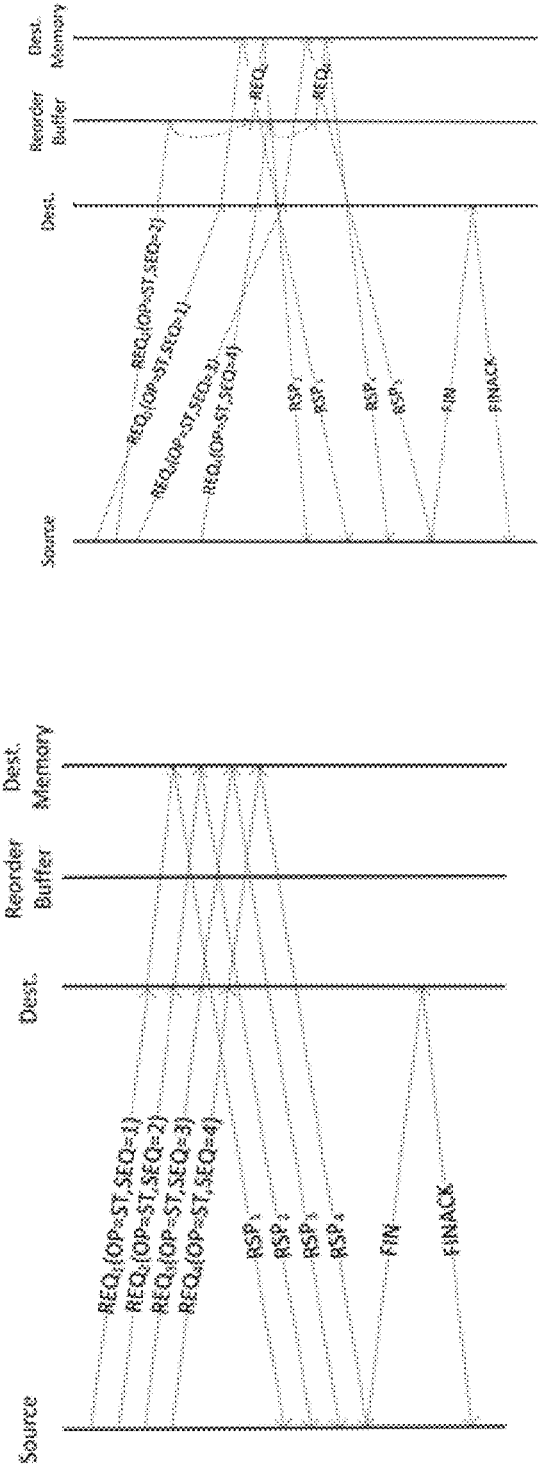
FIG. 3B
FIG. 3A

TRANSCEIVER SYSTEM WITH END-TO-END RELIABILITY AND ORDERING PROTOCOLS

BACKGROUND

Communication between processing nodes in multi-processor systems may suffer from gaps in communication error coverage. For example, in a computing system utilizing a signal switching fabric (also referred to herein as a switching network, or just a 'network') between multiple graphics processing units (GPUs), communication errors arising in the switching fabric or the GPUs themselves may not be recoverable and may potentially cause system failure.

In such a system, when packets are retransmitted due to transmission errors, packet order in the network may change and duplicate packets may be created. A robust protocol will not only recover from transmission errors but also reorder packets and remove duplicate packets when needed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 depicts an example of packet duplication.

FIG. 3A depicts an example of in-order packet arrival.

FIG. 3B depicts an example of out-of-order packet arrival.

DETAILED DESCRIPTION

Figure 1:
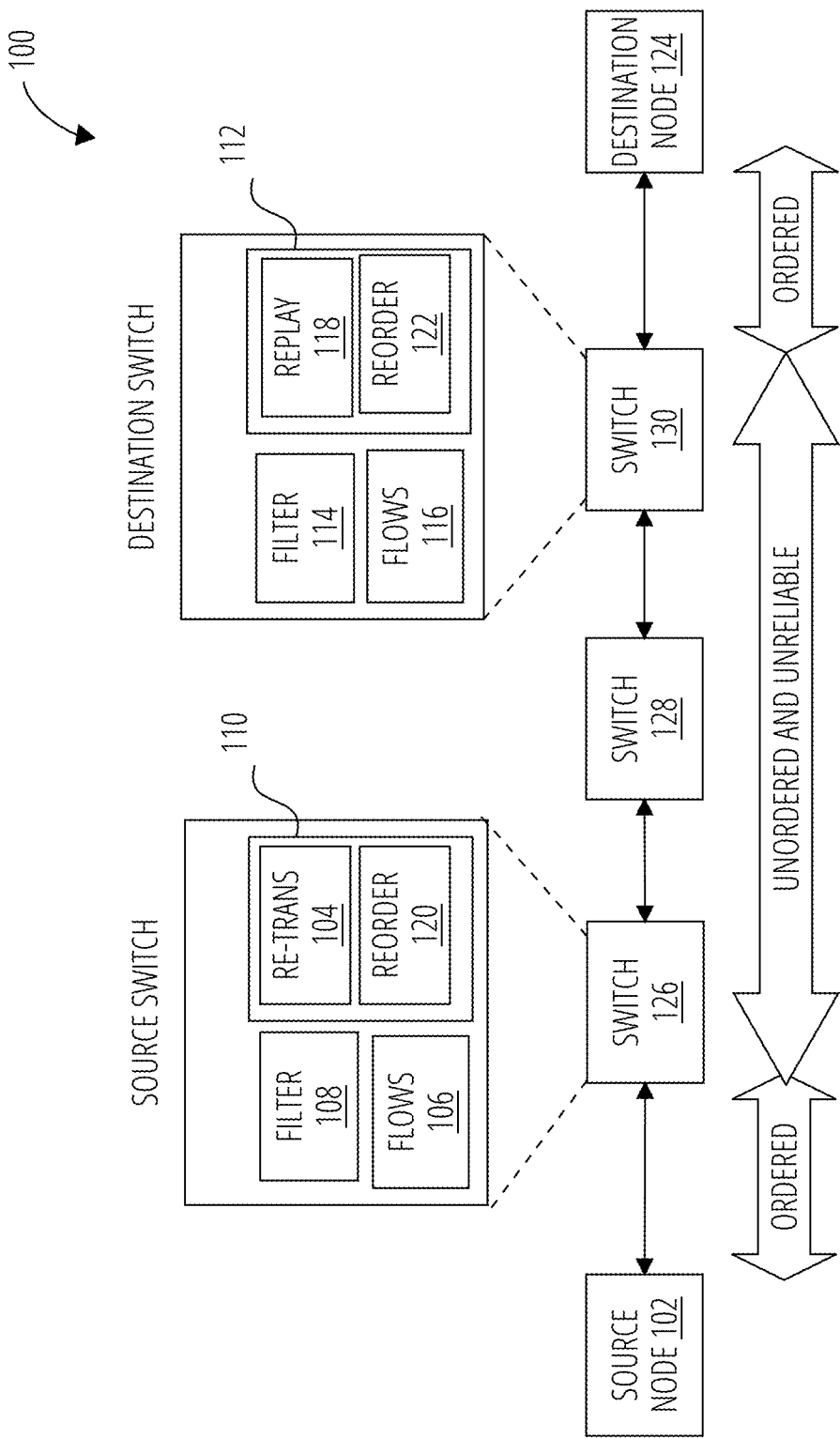
FIG. 1 depicts an example of a packet-based communication system.

Described herein are embodiments of communication protocols providing end-to-end reliability with the logic to provide one or both of ordered deliver and exactly-once delivery over an unreliable and unordered network.

In some multiprocessor systems, the individual processing nodes communicate over a switched network fabric, including communication of inter-node memory accesses (loads and store instructions). Memory accesses may be characterized as either ordered or unordered, and individual operations are executed either at least once or exactly once. Some processing nodes may implement a relaxed memory ordering model. By extending ordering relaxation to network communication, data transfers benefit from performance improvements made possible by techniques such as adaptive routing and multi-pathing, without the utilization of reordering logic, which may be expensive.

However some performance-critical communication patterns may still require ordering. For example, some processing nodes may require sequential consistency per memory location that mandates accesses for the same memory address to be delivered in-order. Another example is bulk data transfers followed by a synchronization operation where the synchronization operation must not be executed before the data transfers have completed. Existing reliability and ordering protocols such as TCP or IB RC are not optimized for small, low-latency memory operations (e.g., reads and writes). These protocols also do not natively support networking features such as multi-pathing and dynamic adaptive routing.

Conventional ordering protocols operate as though a flow of multiple packets to a same destination address begins when the first packet of the flow is sent. In reality, a same-address flow of packets becomes determined after the first request packet is sent, or more specifically, when subsequent packets access the same destination location.

The protocol embodiments described herein utilize a technique referred to herein as "late on-the-fly connection setup". The disclosed protocols set up connections on the fly without requiring an explicit handshake before data is exchanged. The new protocols also defer setting up a connection until a packet directed to the same address as the first packet of the flow, and ordered after the first packet of the flow, arrives at the destination.

Because some switching networks reorder packets, singletons may be mistaken for the first packet of a flow. The disclosed protocol embodiments utilize an identifier, for example the transaction id of the first packet, carrying over as the flow id attached to subsequent packets to create the correct association of packets to a flow at the receiver.

Conventional protocols also do not distinguish the types of operations constituting a same-address flow of packets. These protocols therefore do not account for the possible need for a replay buffer for overlapped same-address operations that fetch data. In some processing systems, overlapping a memory load (LD) operation followed by a memory store (ST) operation requires a replay buffer for the operand fetched by the LD, in case the LD-ST sequence has to be retried. This provides correct observation order. To avoid the utilization of replay buffers, the disclosed protocols may serialize LDs followed by STs.

When a failed LD is reissued, subsequent LDs (that might already have been successfully executed) have to be re-executed as well, to guarantee correct observation order. The disclosed protocol embodiments may accomplish this by forwarding (the most recently received) LD responses to source memory, in order.

Protocols may implement 'counted writes' to determine (at the destination) when the data packets have been delivered so that a synchronization operation may be executed. These protocols may fall back to source-side synchronization when transmission errors occur. Protocols may resynchronize source and destination when errors occur, so that synchronization may be performed on the destination side, instead of the source side.

The disclosed protocols assume an unreliable and unordered network, and may include:

Late on-the-fly flow setup: A same-address flow of packets does not necessarily begin when a first packet is sent. In reality, a same-address flow of packets is determined after the first request packet is sent, that is, when subsequent requests access the same location. "Late on-the-fly flow setup" may be utilized such that flows are set up without requiring an explicit handshake before data is exchanged. Flow setup is deferred until a packet ordered after the first packet of the flow arrives.

Singleton delineation: Because the network may reorder packets, singletons may be mistaken for the first packet of a subsequent flow. A transaction id of the first packet may be carried over as the flow id attached to subsequent packets to create an association of packets to a flow at the receiver.

No replay buffer for ordered flows: Overlapping a load (LD) followed by a store (ST) requires a replay buffer for the operand fetched by LD in case the LD-ST sequence has to be retried. This provides correct observation order. To avoid the need for replay buffers, LDs may be serialized, followed by STs.

Ordered response delivery: When a failed LD is reissued, subsequent LDs (that might already have been successfully executed), may be re-executed as well to provide correct observation order. This may be implemented by forwarding (the most recently received) LD responses to source memory in order.

Error recovery for counted writes: Source and destination may be resynchronized when errors occur such that synchronization may still be done on the destination side.

The following disclosure may be better understood with reference to the following terms. Other terms should be accorded their ordinary meaning in the art unless otherwise indicated by context.

A request packet (REQ) transports an operation from the source to the destination. In return, a response packet (RSP) is sent from the destination to the source. If REQ contains a fetching operation such as a LD, RSP carries the fetched memory value. RSP also serves as an acknowledgment (ACK) or negative acknowledgement (NACK).

The source sends a finalize request packet (FIN) to the destination to mark the end of the flow. The receipt of FIN has the destination deallocate the corresponding flow state. The destination sends a finalize response packet (FINACK) to the source to acknowledge the receipt of FIN and the deallocation of the flow state.

The source sends a go-back request packet (GBK) to the destination after an error has occurred to request resynchronization of the flow states kept at the source and destination. The destination sends a go-back acknowledgment response packet (GBKACK) to the source to acknowledge resynchronization.

The sequence diagrams refer to the following header fields:
OP: operation type
TID: transaction identifier
FID: flow identifier
SEQ: sequence number (starts at 1)
EOD: exactly once delivery
ALOD: at-least once delivery
A transaction refers to a request/response exchange.
A flow refers to a sequence of overlapped requests/operations that have to be executed in order. Opening and closing a flow refers to allocating and deallocating, respectively, of state to correctly sequence the flow's packets.

A singleton is a request/operation that does not belong to a multi-packet flow.

Packets have a maximum lifetime (or time to life (TTL)). That is, packets will not emerge from the network after they have expired.

Example embodiments herein are presented herein for flows that include memory access commands that require ordered execution to preserve observation order. However, the techniques are more generally applicable whenever dependencies in packet flows require ordered delivery. Ordered delivery of packets carrying memory operations that access the same memory location is just one example of a data dependency that requires ordering. Other examples of possible applications include synchronization operations and IO traffic.

Consumer/producer communication patterns typically require synchronization after data has been exchanged. An example is a shared producer/consumer queue in which the producer writes an item into the queue and the consumer subsequently reads the item from the queue. In a distributed system, writing and reading a queue item can involve several packet transfers. Typically, to indicate that an entry was written as well as to indicate that an entry was read, a synchronization operation is executed, for example, to increment a counter after an entry was produced/written, and to decrement a counter after an entry was consumed/read. To avoid errors when accessing the queue, it has to be guaranteed that the synchronization operation is executed only after the entry was written or read. Thus, the synchronization operation requires ordered delivery in the sense that it must not be delivered before the operations to write or read the queue entry have been executed. If writing or reading a queue entry requires several packet transfers, there may be no ordering requirement for those transfers.

Many input/output (IO) standards such as Peripheral Component Interconnect (PCI) require ordering. In distributed systems, IO traffic is often transported over the network, in which case the network has to adhere to ordering rules given by the IO traffic. The reasons IO traffic requires ordering are manifold:

By ordering IO transactions, deadlock scenarios can be avoided.

Many IO standards provide backwards compatibility with legacy standards that provide ordering.

Executing IO operations in the order specified by the programmer simplifies the programming model.

Thus the mechanisms disclosed herein may also be applicable to consumer/producer and networked IO applications, for example.

FIG. 1 is a simplified depiction of a packet-based communication system 100 system in one embodiment. Protocol logic providing packet-based communication between a source node 102 and a destination node 124 is disposed in a source switch 126 and a destination switch 130 (with one or more potentially intermediate switches 128). Packet transport over the access links between the source node 102 and source switch 126, and the destination switch 130 and destination node 124, are ordered. The source switch 126 and the destination switch 130 comprise a shared memory 110 and shared memory 112, respectively. The re-transmission buffer 104 and response reorder buffer 120 of the source switch 126, and the replay buffer 118 and request reorder buffer 122 of the destination switch 130, are implemented in the shared memory 110 and shared memory 112, respectively. That is, once a packet has been received and stored in one of these memories 110, 112, the packet stays in place. "Moving" a packet to one of the reorder buffers 120, 122, or to the re-transmission buffer 104 or replay buffer 118, is reflected in the data structures used to manage memory, and does not require copying of the packet itself. Thus, no dedicated memory is needed to implement the various buffers and the ordering protocol will typically not exceed the capacity of the buffers once a packet has been recorded into the shared memory 110 or shared memory 112.

The source switch 126 comprises a same address filter 108 that tracks the outstanding requests and that determines whether a new request accesses an address already accessed by an outstanding request. The destination switch 130 comprises a history filter 114 that determines whether an incoming request belongs to a flow of which the first request was already received. The source switch 126 and the destination switch 130 both maintain flow states 106 and flow states 116, respectively, to correctly sequence forwarding of requests and responses.

In other words, the transmitter determine a first condition of whether a subsequent memory access packet to transmit specifies access to a same memory address as is specified by one or more already transmitted and outstanding memory access packets. (An outstanding memory access packet is one for which the memory operation specified in the packet has not yet been acknowledged or otherwise demonstrated to the transmitter as being completed). If this first condition is satisfied, the subsequent memory access packet is marked by the transmitter with a same identifier as the one or more outstanding memory access packets specifying the same memory address. The receiver of the packets determines a second condition of whether a second packet received comprises the same identifier and a different sequence numbers as a previously received packet. If this second condition is satisfied, the receiver establishes a packet flow (comprising the previously received packet and the second packet) with the transmitter.

Alternative implementations with the protocol logic implemented in the source node 102 and the destination node 124 will be readily apparent to those of ordinary skill in the art. Such an implementation in the nodes may in some cases strengthen end-to-end reliability but may comprise protocol logic and buffer memories in the nodes, incurring undesirable additions to size, complexity, and power consumption in the nodes.

FIG. 2 depicts an example of packet duplication. Sequences of same-address (weak) operations require in-order, at least once delivery. For example, delivery of sequence (Store 2, Store 1) as (Store 2, Store 1, Store 1) over a network 202 as depicted in FIG. 2 is acceptable.

FIG. 3A depicts an example of in-order packet arrival, and FIG. 3B depicts an example of out-order packet arrival. These examples depict the typical use case where resources at the destination are in place to establish a flow and store REQs in a reorder buffer, if needed. The examples depict a flow comprising four REQs with store (ST) operations for the same memory address. REQs carry a sequence number SEQ.

In FIG. 3A, REQs arrive in-order and, in FIG. 3B, they arrive out-of-order (OOO). REQs that arrive OOO are temporarily stored in the reorder buffer. In the example shown in FIG. 3B, REQ2 and REQ4 arrive OOO and are held in the reorder buffer until they become in-order once REQ1 and REQ3, respectively, are received. Once, the REQs have been delivered and RSPs returned, a FIN/FINACK handshake takes place to close the flow at the destination and the source.

Unlike conventional connection-oriented protocols that explicitly set up a connection, connections (also referred to herein as flows) are opened 'on the fly'. This means that the transmit end of the communication opens a flow when a REQ is injected into the network if the address filter indicates that there already is an outstanding REQ with an operation for the same remote address. On the receiver side, a flow is opened when the first REQ with SEQ>1 is received. A REQ with SEQ=1 could be either a singleton or the first packet of a flow, and therefore opening a flow is deferred until the receipt of a later REQ with SEQ>1. When a REQ with SEQ=1 is received, an entry is made in the history filter to make it possible to later determine whether the first packet of the flow has already been received.

In FIG. 3A, REQ1-REQ4 arrive at the destination in order. First, REQ1 is received and forwarded to the destination memory. The receipt of REQ1 is logged with an entry in the history filter. Next, REQ2 arrives at the destination and opens a flow. Querying the filter shows that REQ1 has been received. Thus, REQ2 is in order and enabled to be forwarded. When REQ3 arrives, a query of the flow state shows that REQ2 was the last in-order REQ received and, thus, REQ3 is in order and enabled to be forwarded. REQ4 is handled similarly. The sequence ends with a FIN/FINACK that removes flow state kept at the source and destination.

In FIG. 3B, REQ2 is the first REQ to arrive at the destination and open a flow. According to the history filter, REQ1 was not received. REQ2 was, therefore, received out-of-order and forwarded to the reorder buffer. Next, REQ1 is received and forwarded. Whenever, a REQn is forwarded, the reorder buffer is checked whether it contains REQn+1. In the example, REQ2 as well as REQ4 are found in the reorder buffer when REQ1 and REQ3, respectively, are received. Once a REQ in the reorder buffer is in order, it is released and forwarded to destination memory. As the example shows, responses may arrive out-of-order as well. Though the receiver may reorder the responses (e.g., using a scoreboard that keeps track of the outstanding requests), the ordering protocol may further employ a response reorder buffer that forwards the responses in order. This provides correct observation order when retransmissions occur.

The history filter in one embodiment stores the tuples {src_id, fid} where src_id identifies the sender and fid identifies the flow. The tuple serves as a unique identifier for a same-address flow. The tuple is written when a REQ with SEQ=1 is received; for REQ1, FID=TID. False negatives are possible in the sense that REQ1 was received and forwarded but not found in the history filter. The handling of false negatives is described later. Also, the inclusion of TID is described later.

In summary, packet forwarding rules may be implemented as follows. A request packet REQn is forwarded to destination memory:
  if n=1,
  if n=2 and the history filter has an entry for the corresponding tuple,
  if REQn−1 has been forwarded according to flow state.

Figure 4:
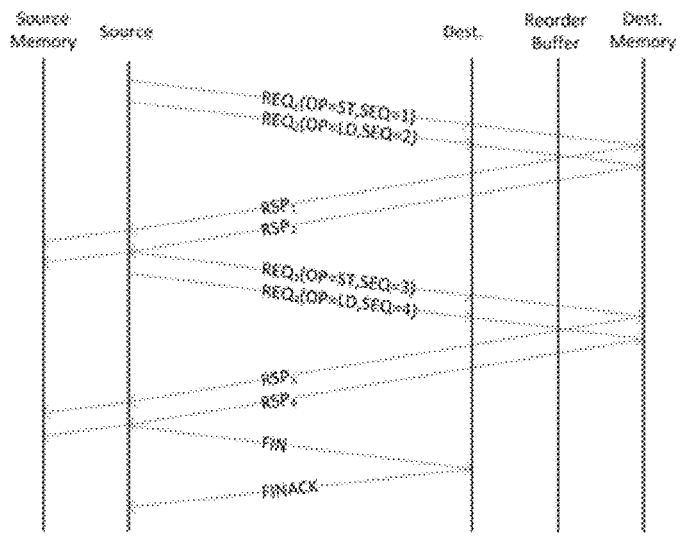
FIG. 4 depicts an example of a serialized load-store sequence.

FIG. 4 depicts an example of a serialized load-store sequence. Packet transfers are overlapped if (i.e., on condition that) the flow contains loads only, stores only, or stores followed by loads. If a load is followed by a store, the load is serialized. In FIG. 4, REQ2 comprises a load and REQ3 comprises a store operation. REQ3 is held back by the source until REQ2 has completed.

Serializing a load followed by a store may obviate the need for replay buffers. If these operations were overlapped, the destination would maintain the load response in a replay buffer to avoid false results in case the load had to be retransmitted due to a transmission error after the store was executed. Eliminating the need for a replay buffer for loads is particularly impactful when the load/store sequence occurs at the beginning of the flow, and thus in some embodiments serialization may be implemented for that circumstance in particular. Without serialization, the destination may need to store every load response in a replay buffer, even for singletons.

If the load/store sequence occurs later in a flow, overlapped transmission and storing of the load response in a replay buffer may be practical because, at that time, the destination may have a record of the flow.

Figure 5A:
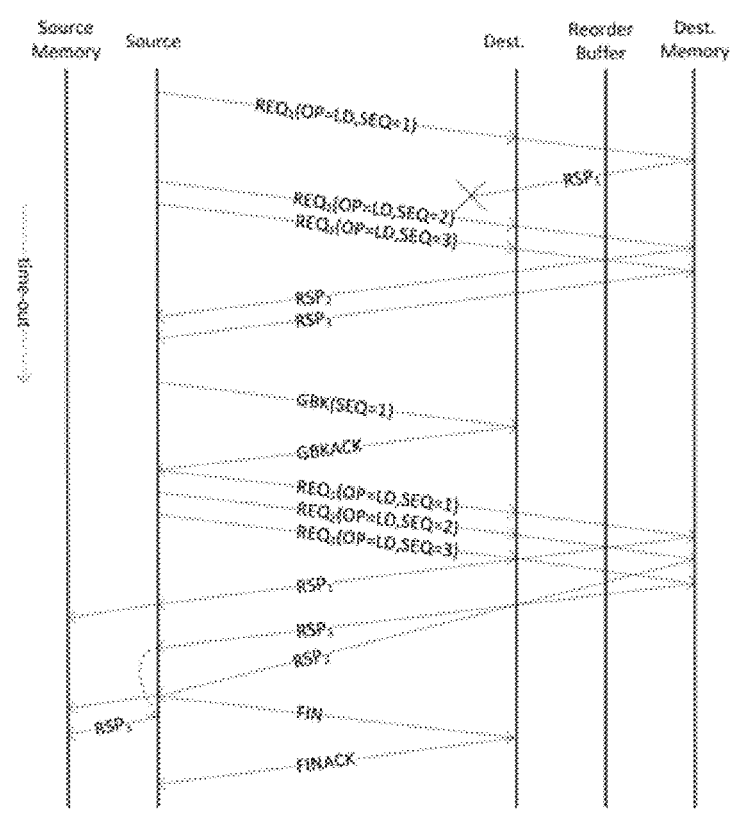
FIG. 5A depicts an example of a lost RSP packet for a load operation.
Figure 5B:
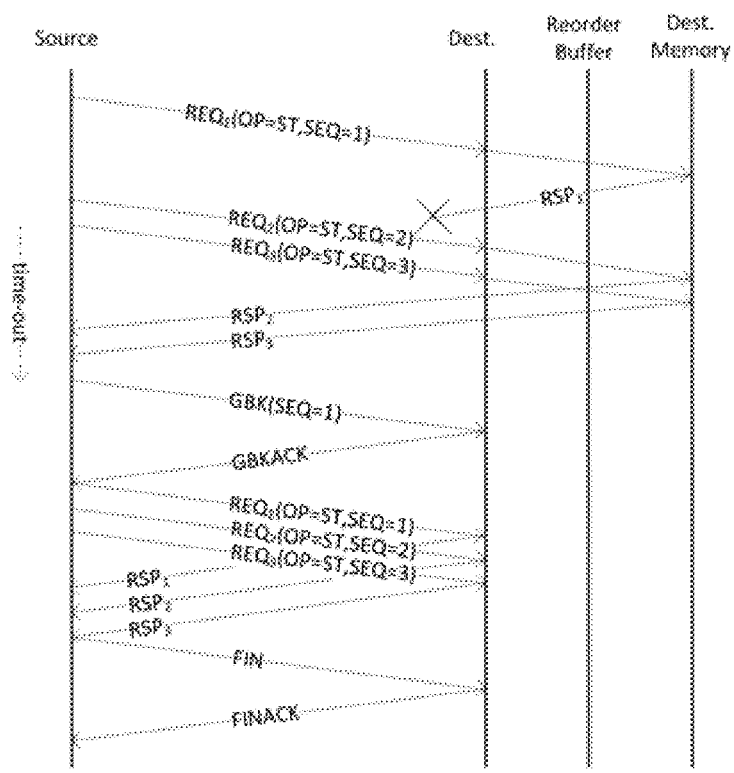
FIG. 5B depicts an example of a lost RSP packet for a store operation.
Figure 5C:
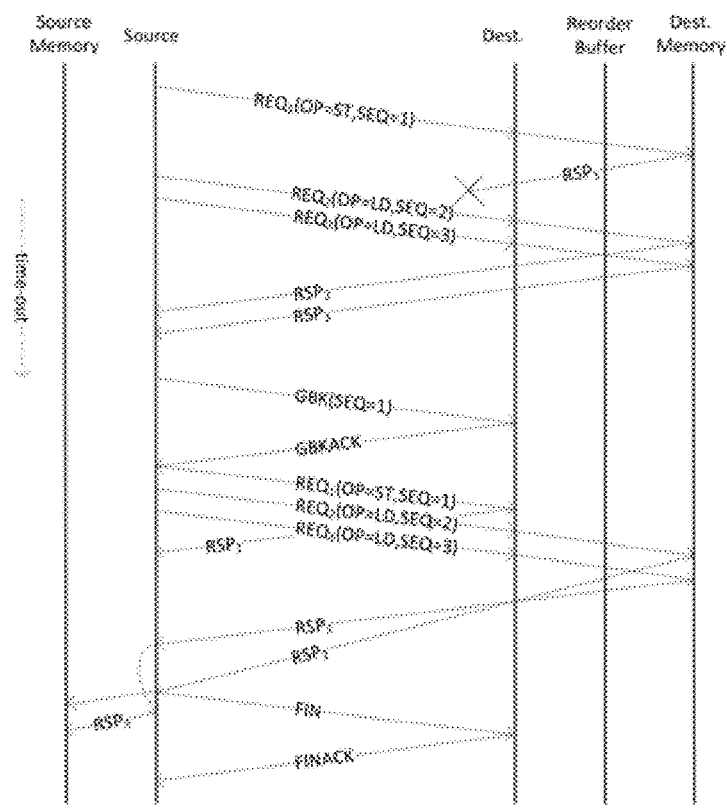
FIG. 5C depicts an example of a lost RSP packet for a store operation followed by a load operation.

FIG. 5A depicts an example of a lost RSP packet for a load operation. FIG. 5B depicts an example of a lost RSP packet for a store operation. FIG. 5C depicts an example of a lost RSP packet for a store operation followed by a load operation. These examples assume that flow state and reorder buffers are available and utilized.

When as depicted an operation fails, the source may initiate a "go back" handshake comprising a GBK request sent from the source to the destination. The GBK request specifies the SEQ of the failed REQ followed by a GBKACK response sent from the destination to the source. Upon completion of the GBK/GBKACK handshake, the source resends the failed REQ as well as REQs that had been subsequently sent. In the depicted examples, three requests REQ1 . . . 3 are sent and forwarded to destination memory. RSP1 is lost, while RSP2 . . . 3 are successfully returned to the source. Once REQ1 has timed out, the source sends GBK(SEQ=1) to let the destination know that the first operation failed.

The destination reacts somewhat differently to retransmitted loads and stores. In the load-only sequence depicted in FIG. 5A, retransmitted loads (REQ1 . . . 3) are re-executed. This way, correct observation order is guaranteed. If only REQ1 was retransmitted, the execution of the loads would become reordered.

FIG. 5B depicts a similar scenario for store operations. In this case, the operations are only ACKed by the destination, and not re-executed, to guarantee observation order. If a store or a sequence of stores is re-executed, the destination node could read values in the wrong order. In the example depicted in FIG. 5B, the retransmission of REQ1-3 may be unnecessary. The receipt of RSP2 implies that the destination had received REQ1. Therefore, the go-back and following retransmitted REQs may not be needed. Configuring the exception handling in this manner to be simple and uniform reduces protocol complexity. Because exceptions are rare, inefficiencies as in the case of FIG. 5B may be tolerated.

FIG. 5C depict a sequence of a store followed by loads. The same rules are applied, that is, the store is ACKed and the loads are re-executed.

In summary, the receiver may respond to a go-back request as follows:
  All REQs are removed from the reorder buffer.
  Retransmitted loads are forwarded to destination memory.
  Retransmitted stores are only forwarded to destination memory if (on condition that) they haven't already been forwarded previously.

The packet destination utilizes a sequence pointer specifying the next request to be forwarded and also records the last forwarded store, as exemplified by the sequence in FIG. 5C. GBK resets the sequence pointer to 1 (one) but the resent REQ1 is not forwarded to destination memory, because the destination records that REQ1 has already been executed.

Retransmission may cause duplicate load responses (e.g., in FIG. 5A, RSP2 and RSP3 are received twice). Therefore the source may ignore load responses received prior to go-back (GBK). Referring to FIG. 5A, the RSP2 . . . 3 packets received prior to GBK are dropped. This implies that load responses should be forwarded to source memory in order and, if multiple copies of some response packet RSPn are received, the RSP packet most recently received should be forwarded. Otherwise, if an out-of-order RSP is forwarded to source memory, an outstanding RSP with a lower sequence number could cause a time-out, making it necessary to re-execute loads and thus invalidate an already forwarded response. This is, for example, the case in FIG. 5A when packets RSP2 . . . 3 are received the first time before the go-back handshake. In-order delivery of responses necessitates a response buffer to hold RSPs until they are in order.

Alternative (more complicated) implementations to deal with transmission errors may be considered. In FIG. 5A, FIG. 5B, and FIG. 5C, when RSP2 is received by the source, and after the time-out caused by the loss of RSP1, RSP1 may be derived from RSP2. The receipt of RSP2 by the source implies that the destination has executed REQ1 even if RSP1 has not been received. In FIG. 5A, the value returned by RSP2 may be used as the return value of the (missing) RSP1. Even if the destination memory had changed and the actual fetched values of REQ1 and REQ2 are different, using the return value generated by REQ2 twice is acceptable because the observation order has been followed. In FIG. 5A, FIG. 5B, and FIG. 5C, the receipt of RSP2 may be interpreted as an ACK for REQ1.

The examples in FIG. 5A, FIG. 5B, and FIG. 5C may suggest that only LDs but not STs may be delivered more than once. However this is not the case. For example, if in FIG. 5B no flow were available when the first copy of REQ2 is received, REQ1 would re-executed after the go-back handshake.

Figure 6A:
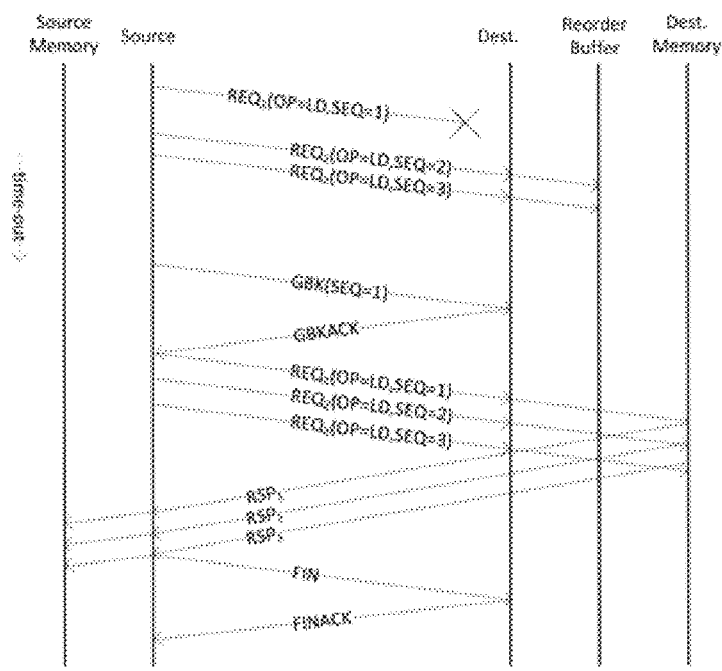
FIG. 6A depicts an example of a lost REQ packet for a load operation.
Figure 6B:
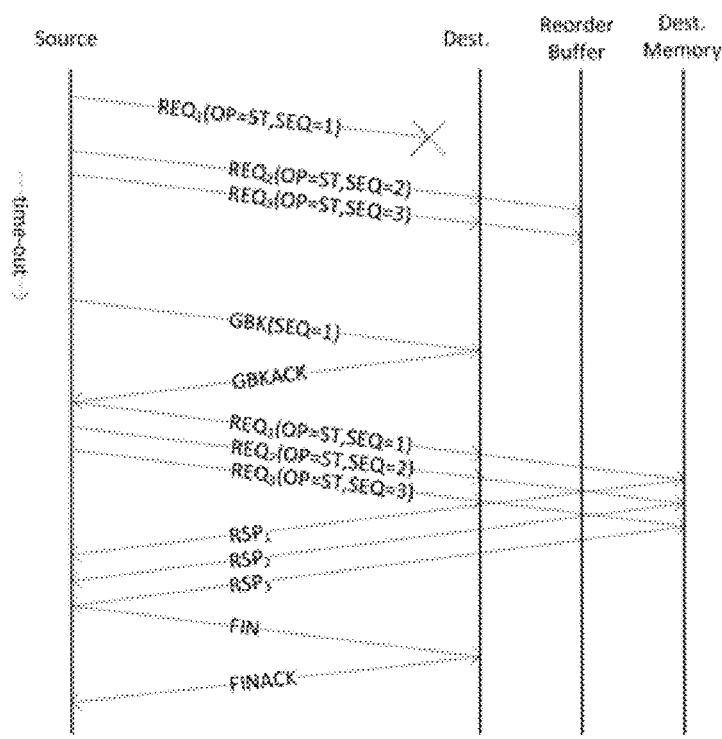
FIG. 6B depicts an example of a lost REQ packet for a store operation.
Figure 6C:
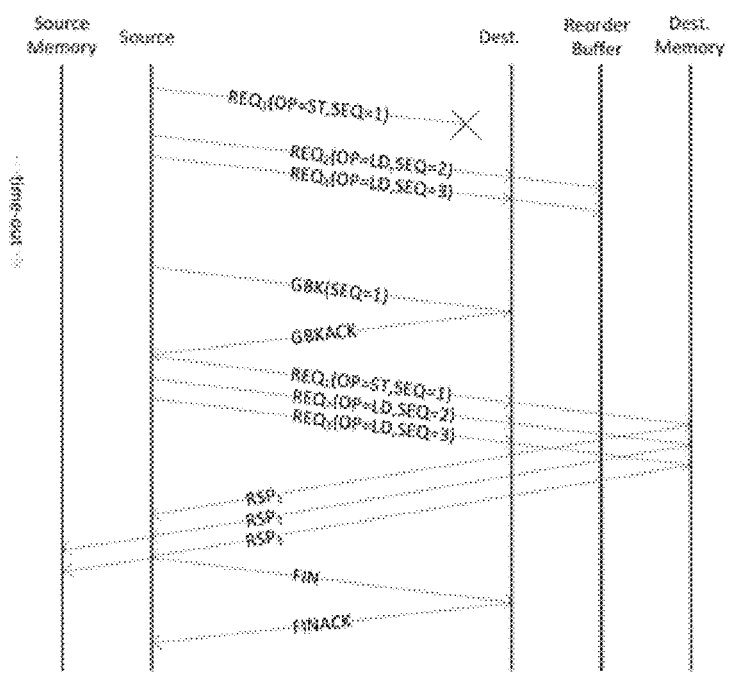
FIG. 6C depicts an example of a lost REQ packet for a store operation followed by a load operation.

FIG. 6A depicts an example of a lost REQ packet for a load operation. FIG. 6B depicts an example of a lost REQ packet for a store operation. FIG. 6C depicts an example of a lost REQ packet for a store operation followed by a load operation.

These examples involve the loss of a REQ packet. In the examples, REQ1 is lost and, thus, the destination receives REQ2 . . . 3 out-of-order and stores these packets in the reorder buffer. Because RSP1 is missing, the time-out timer eventually expires, causing a go-back handshake. This removes REQ2 and REQ3 from the reorder buffer and sets the sequence pointer to 1 (one). In all three scenarios, REQ1 . . . 3 are resent and eventually executed, with no operation being executed prior to the go-back handshake. A flow at the receiver is already in place at the time GBK is received. This does not necessarily have to be the case. Thus, when GBK is received and no receiver flow had been opened, a new flow may be opened.

Time-Out Timer

Figure 7:
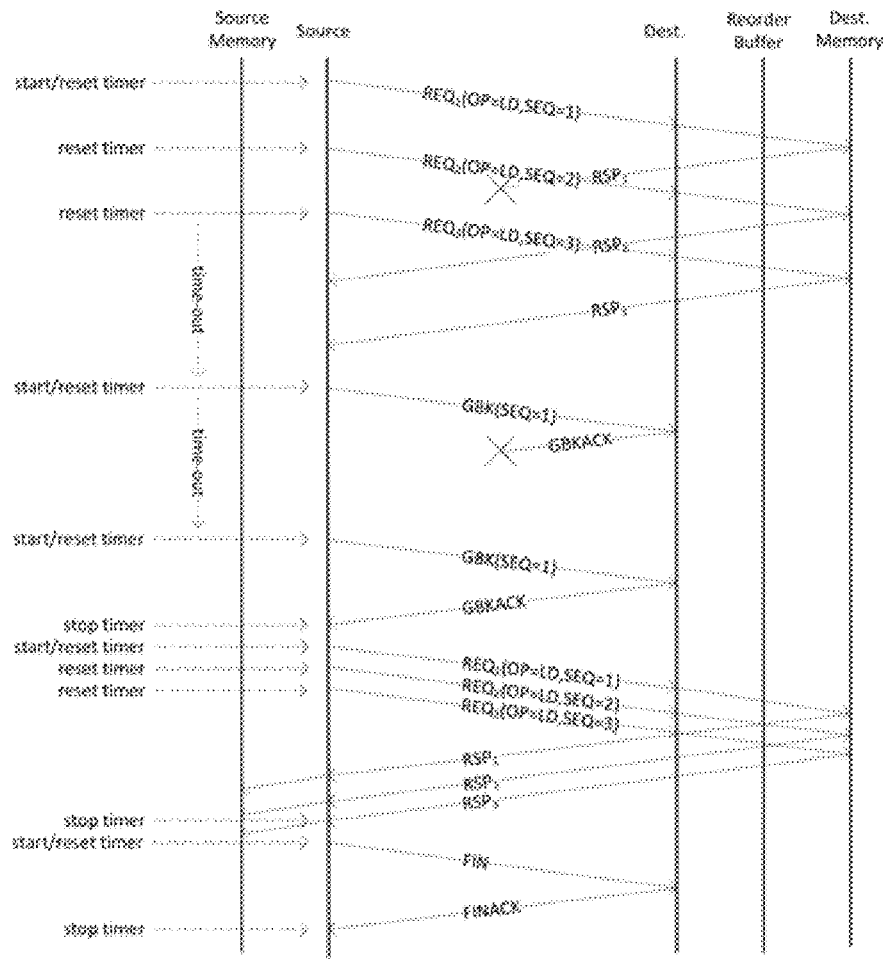
FIG. 7 depicts an example of a reset time-out when a REQ packet is sent.

FIG. 7 depicts an example of a reset time-out when a REQ packet is sent. Because packets have a maximum lifetime, a time-out timer may be used to detect the loss of a packet. A time-out timer could be initiated for every packet sent into the network. However, checking a timer for every outstanding packet creates significant overhead. The schemes described below utilize only one (or two) timer(s) per flow.

A single timer per flow may be reset every time a REQ is sent. If the timer expires and there are outstanding REQs, a REQ or RSP has been lost and a GBK/GBKACK sequence is triggered. In the example in FIG. 7, the timer is started when REQ1 is sent, and reset when REQ2 and REQ3, respectively, are sent. Since RSP1 is lost, the timer times out, triggering a GBK/GBKACK handshake.

The time-out timer is also started/reset when GBK or FIN are sent to capture errors occurring during GBK/GBKACK and FIN/FINACK handshakes. If any of these packets are lost, a timeout will occur and the corresponding handshake is re-tried.

The time-out time has to be set to a value which is greater than twice the maximum packet lifetime (to cover REQ as well as RSP forwarding times). When the time-out timer expires, there is high confidence that no more RSPs will be received.

For long flows, it could potentially take a long time for an error to be detected as the timer is reset every time a REQ is sent. Furthermore, a significant amount of reorder buffer space might be consumed because every REQ received after a lost REQ is treated as out-of-order. Different measures may be implemented to prevent this. A maximum flow length may be enforced that bounds the time it takes to report an error and also limits the number of entries in the retransmission and reorder buffers taken up by the flow. Another option is to add a mechanism at the destination that detects that no progress is being made. Such a mechanism may use a timer to detect that entries have not been forwarded for some configured period of time, or limit/bound the consumption of reorder buffers by a flow. Lack of progress may be reported back to the source by a NACK indicating a timeout or excess of buffers used, respectively.

Figure 8:
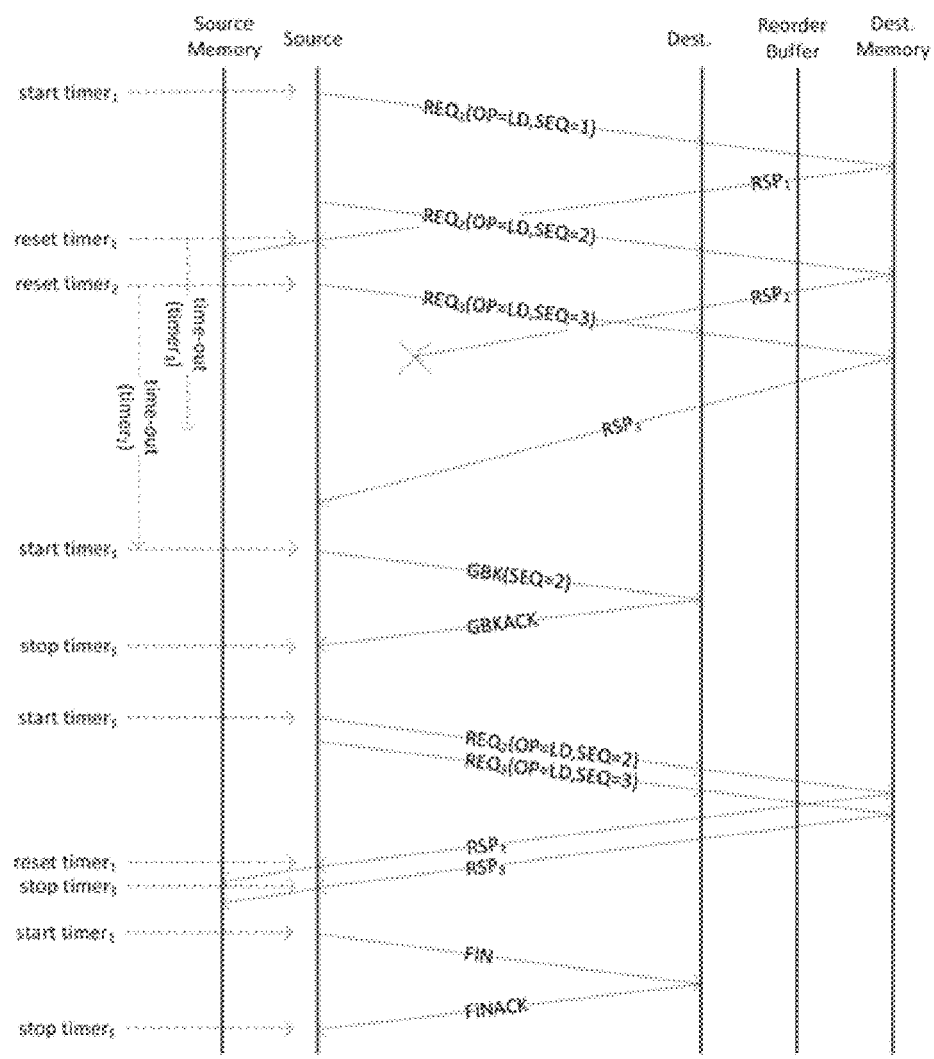
FIG. 8 depicts an example of a reset time-out when a RSP packet is received.

FIG. 8 depicts an example of a reset time-out when a RSP packet is received. The time-out timer is reset when the next in-order RSP is forwarded to source memory (rather than when a REQ is sent). The scheme relies on ordered return of RSPs to source memory. Because this is already implemented in the ordering protocol, no additional logic is required. An additional timer is utilized to ensure that outstanding REQs have timed out before the go-back handshake begins. This timer is reset every time a REQ is sent.

In FIG. 8, timer1 is the timer that is reset when the next in-order RSP is received. Timer2 is the timer reset whenever a REQ is sent. In the example RSP2 is lost, as captured by the time-out of Timer1, which is reset when RSP1 was received. The protocol waits for Timer2 to expire to ensure all RSPs are received before the go-back handshake. RSP3 arrives while waiting for Timer2 to expire. In FIG. 8, Timer2 is depicted as being reset when REQ3 is sent.

An advantage of this scheme is that the time to detect the loss of a packet is bound by 2*max_packet_lifetime, and no restrictions on flow length need be imposed.

Figure 9A:
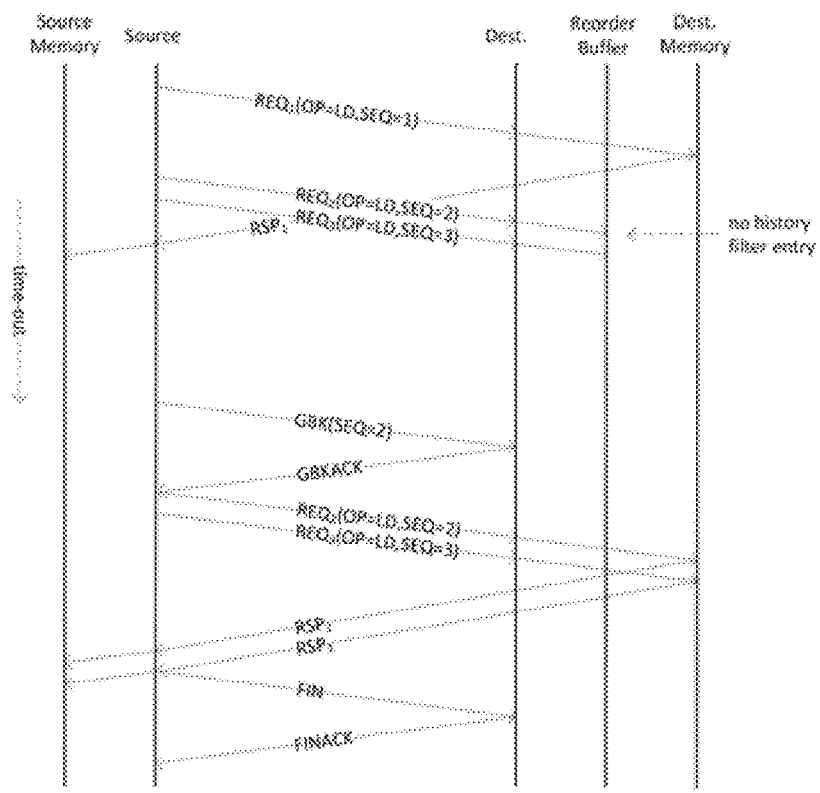
FIG. 9A depicts an example of a no-history filter entry for a load-only sequence.
Figure 9B:
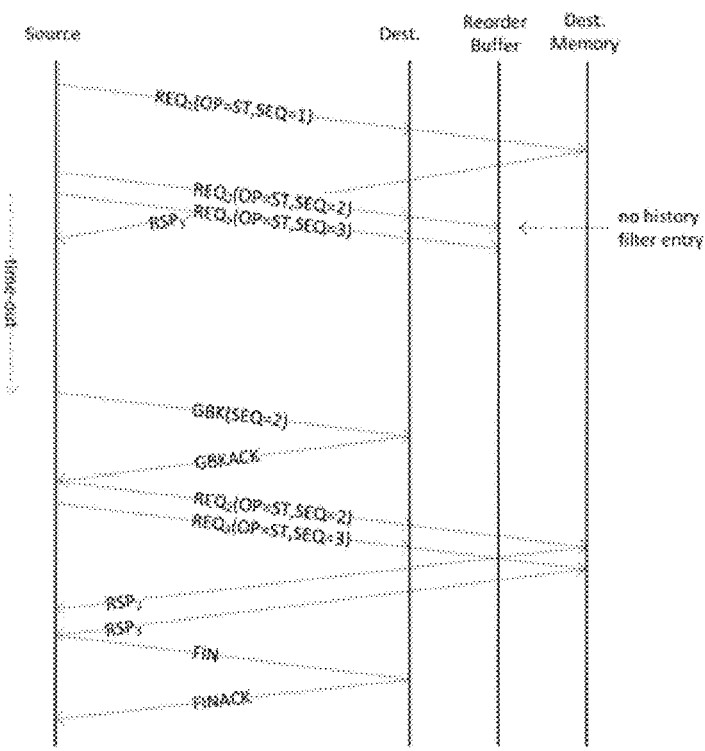
FIG. 9B depicts an example of a no-history filter entry for a store-only sequence.

FIG. 9A depicts an example of a no-history filter entry for a load-only sequence. FIG. 9B depicts an example of a no-history filter entry for a store-only sequence. These are scenarios in which the receiver lacks some of the resources necessary to enable line-rate overlapped transmission.

Where the history filter is implemented as a cache, an entry might have been evicted by the time a subsequent REQ queries the filter. FIG. 9A and FIG. 9B are examples in which REQ2 and REQ3 arrive at the destination and no entry for REQ1 is found in the history filter. As a result, REQ2 and REQ3 are considered out-of-order and stored in the reorder buffer. As no RSPs are generated, REQ2 . . . 3 will eventually time out and cause a go-back handshake and subsequently retransmission of REQ2 . . . 3. This procedure is the same as the one utilized for dealing with transmission errors.

Figure 10A:
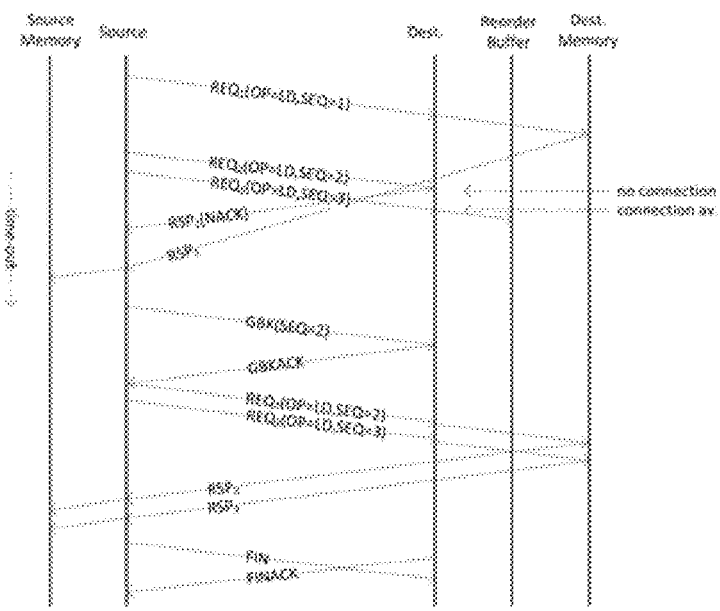
FIG. 10A depicts an example of a no-flow state for a load-only sequence.
Figure 10B:
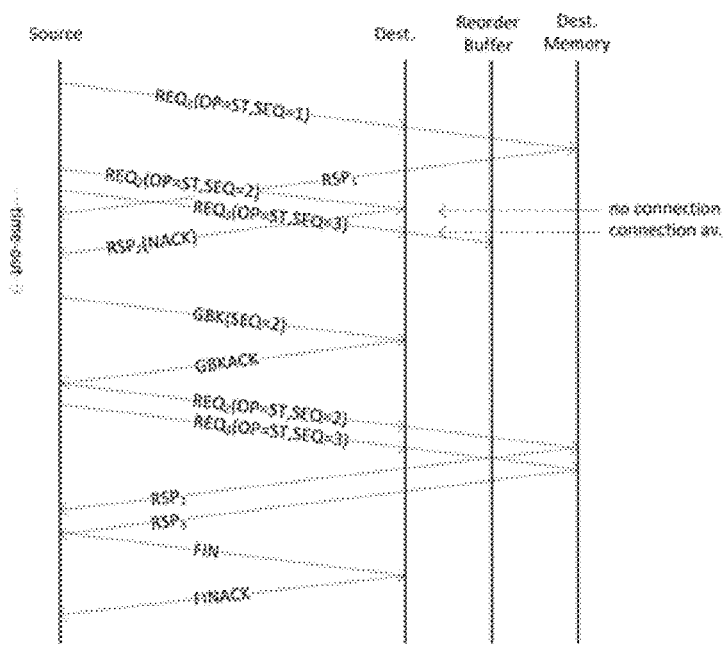
FIG. 10B depicts an example of a no-flow state for a store-only sequence.

FIG. 10A depicts an example of a no-flow state for a load-only sequence. FIG. 10B depicts an example of a no-flow state for a store-only sequence. In these examples, no flow is available when REQ2 arrives. When REQ3 arrives, a flow is available and REQ3 is stored in the reorder buffer. As a result, RSP2 with a NACK is returned. A NACK is treated like a transmission error, eventually causing a time-out that triggers a go-back handshake. In one embodiment, the destination may drop REQ2 and not return RSP2 at all.

Figure 11:
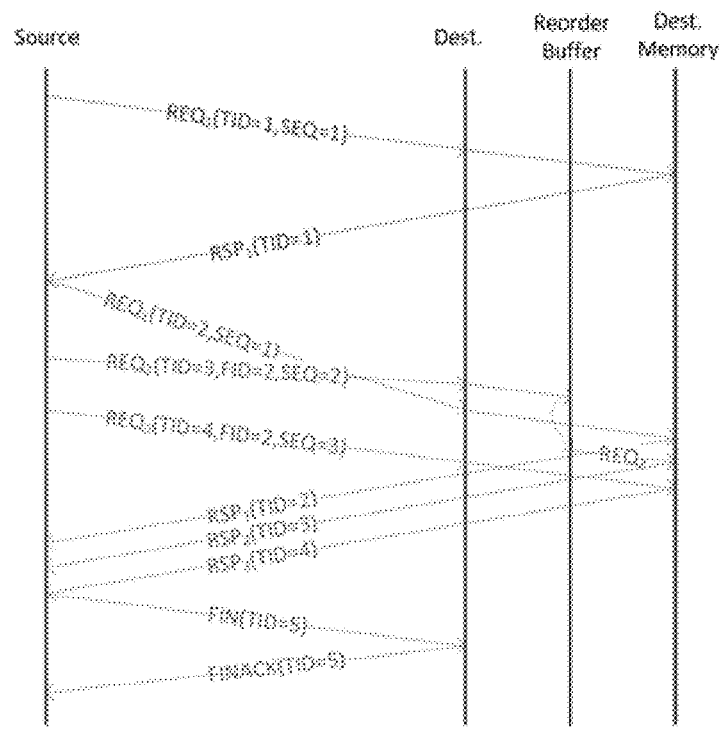
FIG. 11 depicts an example of flow reassembly.

FIG. 11 depicts an example of flow reassembly. Because REQs may be reordered in the network, the arrival of a singleton may be interleaved with the arrival of the REQs of a subsequent flow. If all REQs carry operations accessing the same address, additional information is needed to disambiguate the singleton and the flow. In FIG. 11 a singleton (topmost REQ and RSP) is followed by a flow (remaining packet transfers) with all REQs carrying operations for the same destination address. In the example, REQ1 and REQ2 of the flow (not the singleton) arrive out of order. When REQ2 arrives first, it should not be considered in order by falsely concluding that the preceding singleton was the first REQ of the flow.

A mechanism may be utilized to distinguish between a singleton and a subsequent flow. In one embodiment, a 'late-binding method' is utilized to associate REQs with a flow by reusing the TID of the first request as the FID for the subsequent REQs of the flow. In FIG. 11, at the time REQ1 of the flow is sent, it is not known whether it starts a flow and, thus, no FID is provided. A flow is established with the transmission of REQ2. An FID is attached to REQ2 and subsequent REQs. To be able to associate the REQ1 of the flow with the followings REQ2-3, the FID is set to the value of TID of the REQ1 of the flow. This way, the destination has enough information to correctly re-assemble the flow (and delineate it from the preceding singleton).

The destination may utilize a history filter to determine whether a REQ2 is in order; that is, whether REQ1 has been received and forwarded. In the example of FIG. 11, REQ2 arrives first at the destination, at which time no flow state has been allocated. The history filter is looked up using the key <source_id, FID=2>. No entry is found and REQ2 is correctly considered out-of-order.

To help ensure correct operation, entries in the history filter should expire before the corresponding TID is recycled and reused. In order to time out entries in the history filter, entries may be supplied with a timestamp when they are entered. When they are retrieved and the timestamp indicates that they have expired, entries may be ignored.

In a pool of n TIDs with a maximum of m outstanding REQs there are n−m 'free' TIDs. If the free TIDs are stored in a FIFO and recycled cyclically, it takes at least (n−m)*t_s time, where t_s is the packet serialization time, before a TID is reused. For example, if m=1000, n=5000 and t_s=32*8 bits*1/200 Gbit/s=1.28 ns (where 32 bytes is the minimum packet size and 200 Gbit/s is the transmission rate), the reuse interval is >=4000*1.28 ns=5.2 us, which in turn determines the maximum lifetime t_h of an entry in the history filter.

The size of the history filter is determined by the amount of time REQ1 packets have to be remembered. In FIG. 11, REQ2 of the flow arrives at the destination no later than the round trip time (RTT) after REQ1 of the flow (ignoring network skews)—otherwise the two REQs do not belong to the same flow. Therefore, the maximum capacity of the history filter is RTT/t_s, where t_s is the packet serialization delay. For example, if RTT=7 us and t_s=1.28 ns, a maximum of e=5,469 entries are needed.

Anther constraint as noted above is the maximum allowed lifetime t_h of an entry in the history filter. If t_h=5.2 us as in the example above, considering both constraints, e*t_s<min(RTT, t_h) results in e=4,063 entries.

If t_h<RTT, the source has to guarantee that REQ2 is injected at most t_h time after REQ1 is injected. If this timing constraint cannot be met, the injection of REQ2 has to be delayed until after RSP1 is received (in which case REQ2 becomes another REQ1).

Non-idempotent operations such as atomics may require exactly-once delivery. In order to be able to detect duplicates, a flow may be utilized to keep track of the requests that have been delivered. In contrast to the protocol described above for at least once delivery (ALOD), exactly once delivery (EOD) may require a flow to be established as soon as the first request of a flow is received.

'Duplicate' refers to a packet that is a copy of a prior packet and, thus, indistinguishable from the original (prior) packet. Duplicate and original packet do not necessarily have to be present at the same time in the network.

In addition to flow state, EOD may further require replay buffers if operations fetch data in order to be able to 'replay' responses of failed REQ/RSP transactions. A protocol for EOD may handle transmission errors using the previously described time-out and go-back mechanisms.

Figure 12:
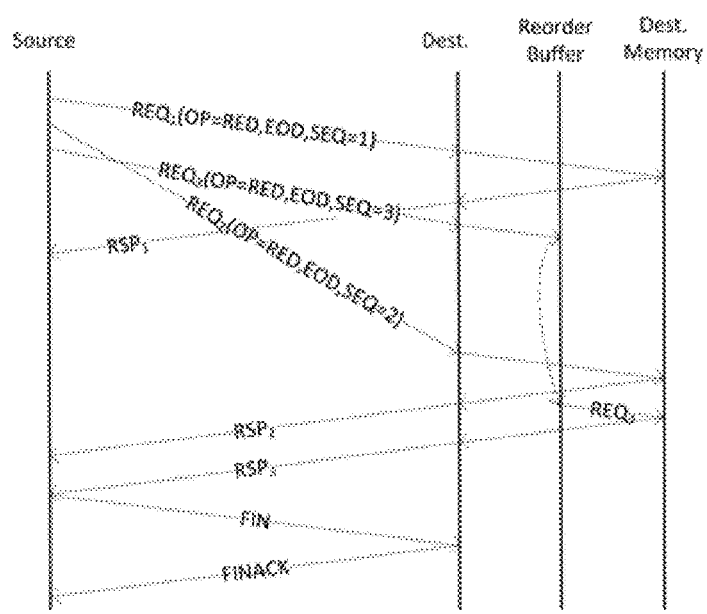
FIG. 12 depicts an example of exactly once delivery (EOD) for non-fetching operations.

FIG. 12 depicts an example of exactly once delivery (EOD) for non-fetching operations. The example in FIG. 12 shows a sequence of three non-fetching reduce operations (for the same address). The sequence diagram resembles some of those previously discussed with the exception that the destination opens a flow as soon as the first REQ arrives. Because non-fetching atomics do not return a value, no replay buffers are needed.

Figure 13:
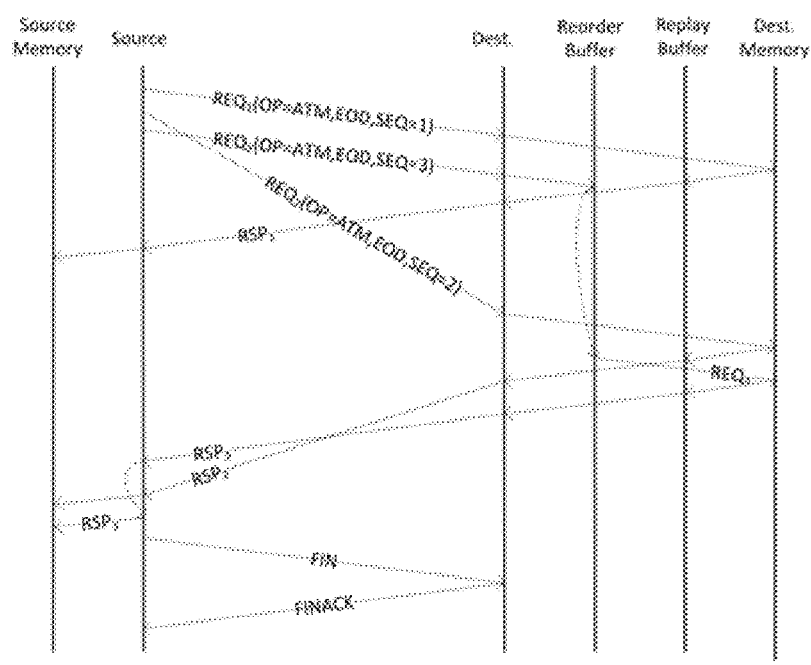
FIG. 13 depicts an example of exactly once delivery (EOD) for fetching operations.

FIG. 13 depicts an example of exactly once delivery (EOD) for fetching operations. Fetching operations such as atomics may require that fetched data is stored in replay buffers until it is confirmed that the source has received the data. Fetched values are again returned to source memory in-order. Though EOD doesn't necessitate this because there cannot be any duplicate RSPs, return values may be ordered to homogenize protocols. Mechanisms for freeing replay buffers are discussed below. Although these examples depict flows comprising the same operation types (either fetching or non-fetching), a flow may more generally comprise a mixture of these operation types.

Figure 14A:
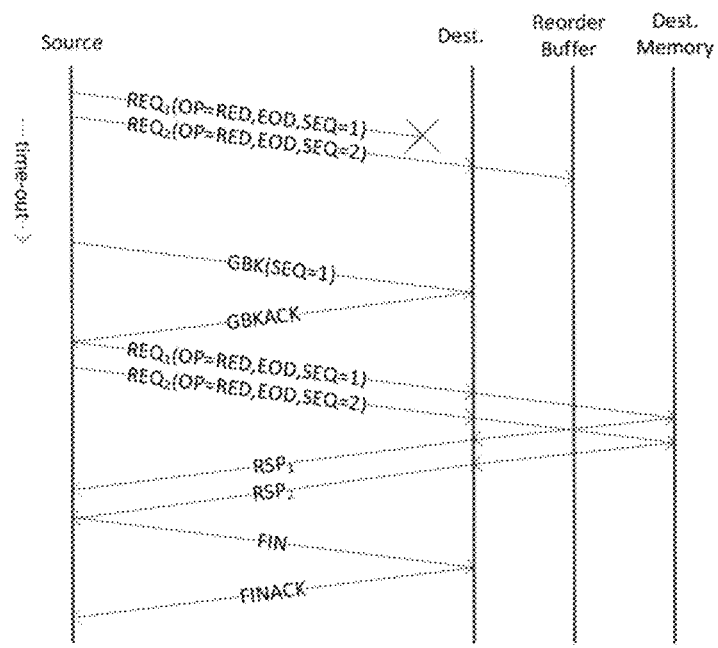
FIG. 14A depicts an example of REQ packet loss for non-fetching operations.
Figure 14B:
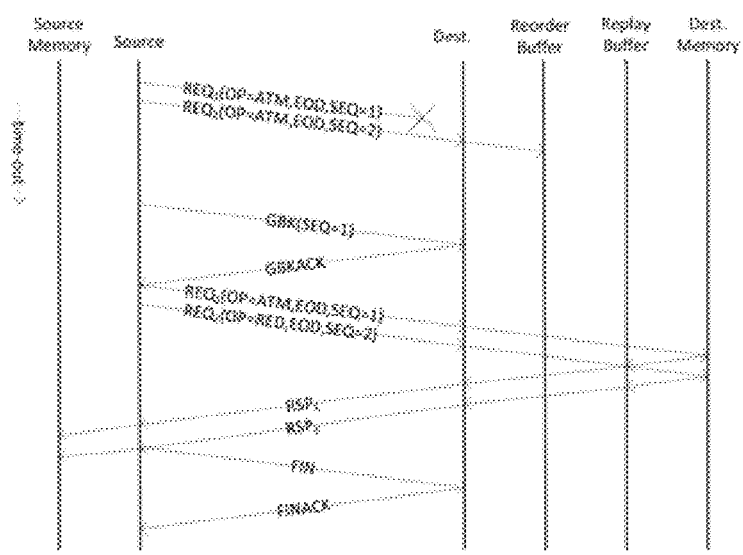
FIG. 14B depicts an example of REQ packet loss for fetching operations.
Figure 15A:
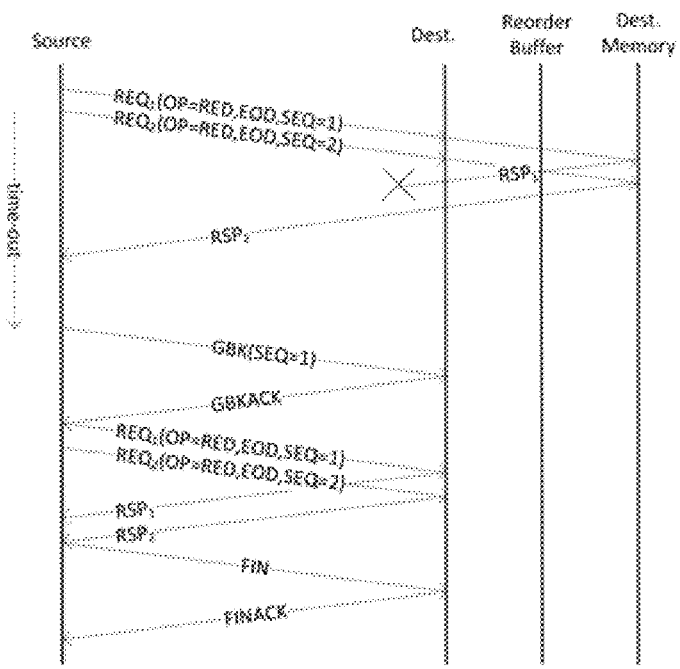
FIG. 15A depicts an example of RSP packet loss for non-fetching operations.
Figure 15B:
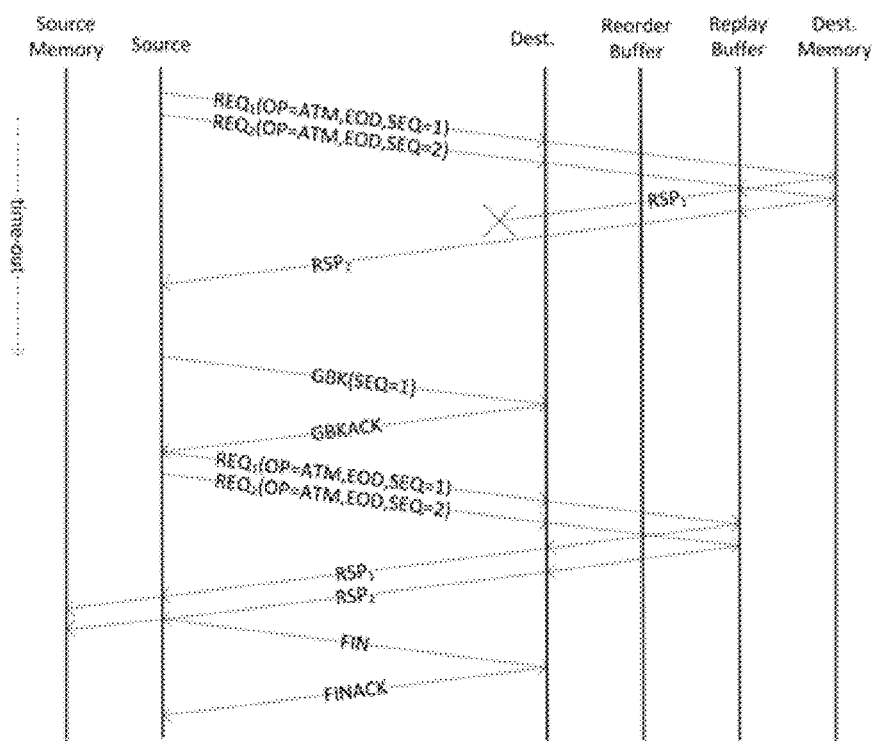
FIG. 15B depicts an example of RSP packet loss for fetching operations.

FIG. 14A depicts an example of REQ packet loss for non-fetching operations. FIG. 14B depicts an example of REQ packet loss for fetching operations. FIG. 15A depicts an example of RSP packet loss for non-fetching operations. FIG. 15B depicts an example of RSP packet loss for fetching operations.

The same time-out mechanism and go-back handshake described previously may be utilized to detect transmission errors and re-synchronize source and destination, respectively, before the sequence of transactions starting with the failed REQ/RSP transaction is retried.

Figure 16:
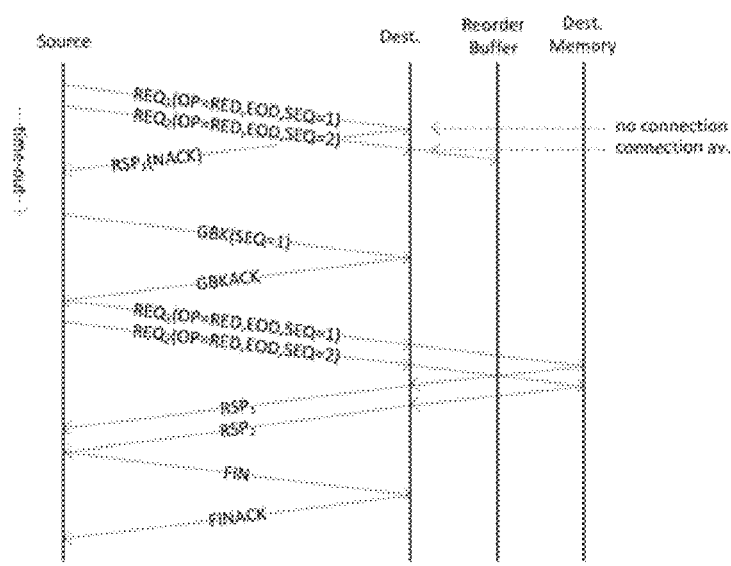
FIG. 16 depicts an example of exactly once delivery when no flow is available.

FIG. 16 depicts an example of exactly once delivery when no flow is available at the destination. No flow is available at the time REQ1 arrives at the destination. REQ1 is, therefore, dropped and NACKed. When REQ2 arrives, a flow has become available and REQ2 is put into the reorder buffer. A NACK is treated similarly to a transmission error as described above. The go-back mechanism may be utilized to homogenize protocols. When an EOD REQ/RSP transaction fails, it may be retransmitted without resetting flow state.

Figure 17A:
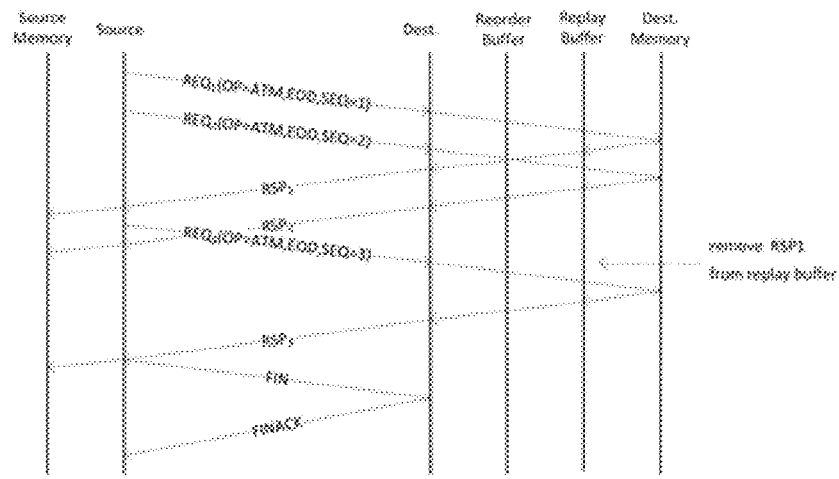
FIG. 17A depicts an example of freeing replay buffers by limiting outstanding REQ packets.
Figure 17B:
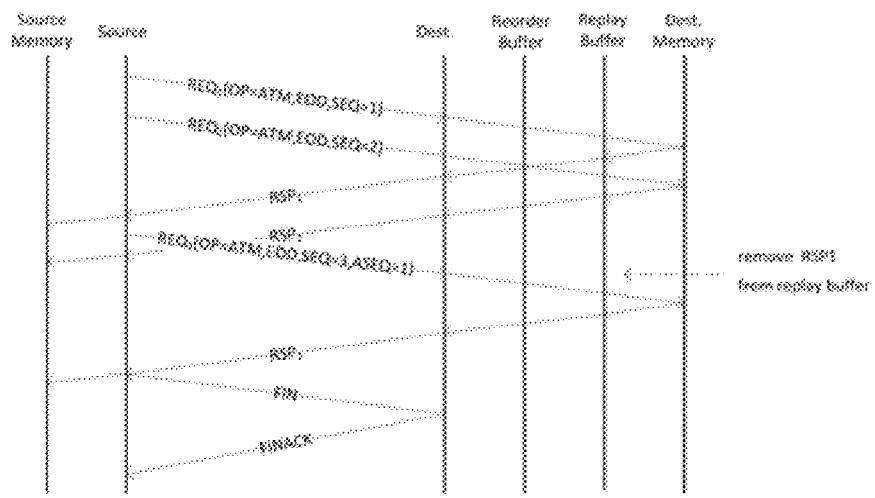
FIG. 17B depicts an example of freeing replay buffers using a sliding window.

FIG. 17A depicts an example of freeing replay buffers by limiting outstanding REQ packets. FIG. 17B depicts an example of freeing replay buffers using a sliding window.

Reorder buffers may be freed as soon as REQ packets have been forwarded to destination memory. Replay buffers cannot be freed until the corresponding response packets have been successfully delivered to the source. Terminating a flow with a FIN/FINACK handshake eventually frees all replay buffers. An additional mechanism may be utilized to bound the number of replay buffers used by a flow. This may be particularly advantageous for long sequences of same-address accesses where progress may be hindered when too many replay buffers are occupied.

One solution is depicted in FIG. 17A, where the source limits the number of outstanding REQs. Assuming m is the maximum number of outstanding REQs, the receipt of REQ(SEQ=n) tells the receiver that REQs with SEQ<=n−m in the replay buffer may be freed. In the example, m=2. Thus, the receipt of REQ3 removes RSP1 from the replay buffer.

Another solution as depicted in FIG. 17B is the addition of a sliding window mechanism using an "acknowledged sequence number" field ASEQ that lets the source communicate to the destination what the highest received in-order sequence number is. The destination may use this information to remove any RSP of that flow with SEQ<=ASEQ from the replay buffer. In FIG. 17B, REQ3 specifies ASEQ=1 to let the destination know that RSP1 has been received and the corresponding replay buffer may be freed.

Robust protocols should handle situations of resource exhaustion. A robust protocol should work properly when resources are exhausted and operate to prevent resource starvation.

Resources that may be limited include:

Source-side flows: The source halts transmission of REQs until flows are freed up.

Retransmission buffer: Once the source switch accepts a REQ, space in the retransmission buffer may be guaranteed. See Note 1 below.

Response buffer:
  Option 1: A response buffer is allocated before a REQ with a fetching operation is issued. This applies to both ALOD and EOD. See Note 2 below.
  Option 2: The source drops RSP when no response buffer is available causing a retransmission of the corresponding REQ and replay of the RSP.

Destination-side flows: The destination NACKs REQs if no flow is available. See Note 3 below.

Reorder buffer: Once the destination switch accepts a REQ, space in the reorder buffer is guaranteed. See Note 1 below.

Replay buffer: A replay buffer is allocated before a fetching operation is forwarded to destination memory (EOD only). See Note 2 below.

Note 1: The central memory switch may guarantee that, once a packet has been accepted, the packet can be placed into the retransmission buffer (source switch) or the reorder buffer (destination switch). If there is no space in memory, the packet may be dropped, causing the protocol to treat this case like a transmission error.

Note 2: Buffer space for RSPs needs to be reserved before the corresponding REQ is forwarded and the transported operation is executed. If there is no space in the response buffer in the source switch (option 1), transmission of the corresponding REQ may be postponed until space becomes available. This technique, however, does not work if there is no space in the replay buffer in the destination switch. Because packets have a maximum lifetime, transmission cannot be delayed by a significant amount of time. Thus, a REQ that is ready to be forwarded to destination memory needs to be NACKed if no space may be reserved in the replay buffer. To prevent starvation, the destination should reserve replay buffer space for at least one RSP. That is, the destination must only open a flow if space in the replay buffer may be reserved. Similarly, space for at least one REQ should be reserved in the central memory when the destination opens a flow to guarantee progress.

Note 3: When destination-side flow state has been exhausted, starvation might occur if the REQs of a source are repeatedly NACKed. Known techniques such as exponential backoff or resource reservation protocols may be utilized to mitigate starvation.

On the source side, the maximum number of flows is at most the maximum number of outstanding requests. To estimate the number of flows needed at the destination, assume that there are n sources each injecting packets for one flow and that all flows are destined for the same destination. Further assume that there are no packet collisions in the network and that the aggregate injection rate for all flows equals the aggregate ejection rate of all flows. In a worst-case scenario, the n sources inject same-address requests maximally spaced apart at an interval of round trip time (RTT). Thus there may be at most $n=RTT/t\_s$ active flows at the destination. For example, with RTT=5 us and $t\_s=1$ ns, a maximum number of $5k$ flows is needed.

Figure 18:
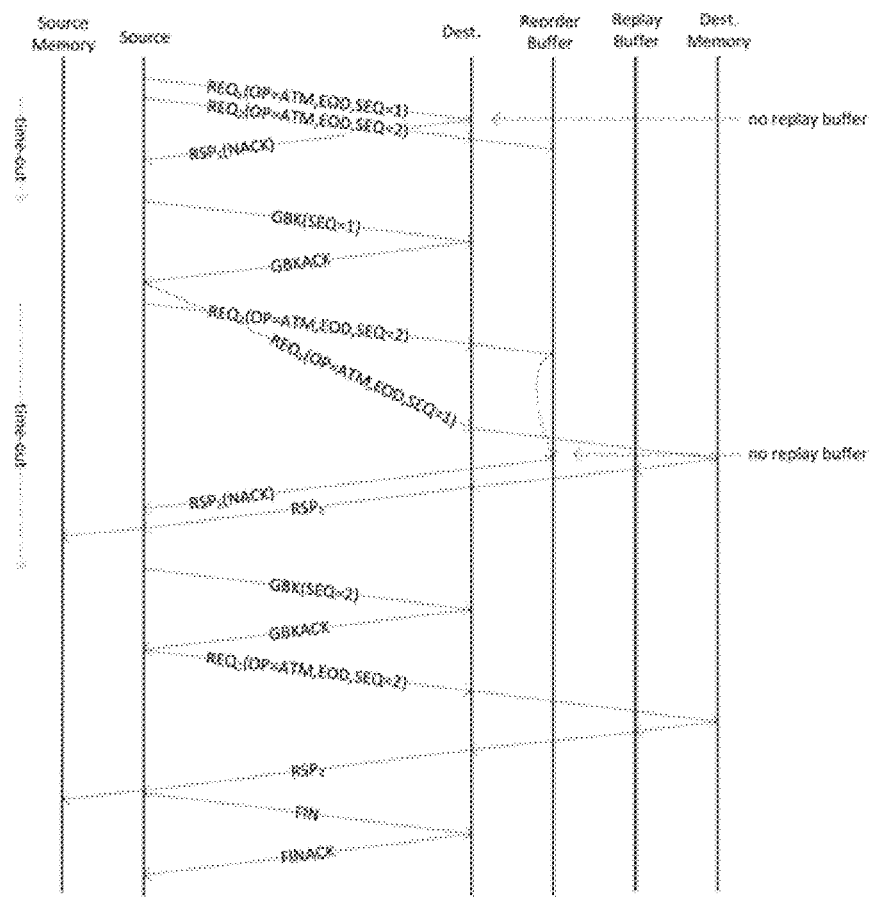
FIG. 18 depicts replay buffer management in accordance with one embodiment.

FIG. 18 depicts replay buffer management in accordance with one embodiment. Once a fetching non-idempotent operation is forwarded to destination memory for its execution, it has to be guaranteed that the replay buffer has space for the fetched value. Before a REQ is forwarded to destination memory, space for the fetched value has to be allocated in the replay buffer. FIG. 18 shows two examples of REQs that are NACKed because there is no space in the replay buffer. Holding back a REQ until space in the replay buffer is available is not an option given that packets have a maximum lifetime.

When replay buffer space becomes scarce, flows might be starved. To prevent this, techniques may be applied such as allocating replay buffer space in a round-robin fashion to sources requesting the opening of a flow. A single replay buffer suffices for a flow to make progress. Thus, the right policy might be that the destination opens a flow for fetching EOD operations only if replay buffer space is available. To guarantee progress, at least one replay buffer may be reserved when a flow is opened.

Some types of switches, such as Ethernet switches, may create duplicate packets. For example when some switches receive a frame and cannot find its destination address in the MAC table, they flood all output ports.

To distinguish duplicates generated in the network from duplicates generated by a source (caused by retransmissions), a version field may be added to the packet headers. The receiver may utilize a deduplication filter indexed by key <source_id, TID, version> that guarantees at-most-once delivery. Entries have to stay in the deduplication filter as long as network-generated duplicates may appear at the receiver or the packet has not expired (if that time is shorter than the former).

No additional mechanism is needed for deduplication of REQs with SEQ>2. Thus, the version field is only needed for REQs with SEQ=1 (which may be singletons or the first REQ of a flow). If few retransmissions are expected, Huffman encoding may be utilized for the version field, adding just one bit to packets that have not been retransmitted. The same mechanism may be utilized for REQs, GBK, and FIN packets.

Conventional mechanisms deal with duplicates on the return path. For example, some graphics processing units (GPUs) maintain a scoreboard indexed by the TID and use it to deduplicate responses. It has to be guaranteed that the scoreboard remembers a TID as long as duplicates may arrive and, further, that a TID is not reused for that amount of time. Other return packets, e.g., GBKACK and FINACK, may be handled the same way as regular RSPs.

Figure 19:
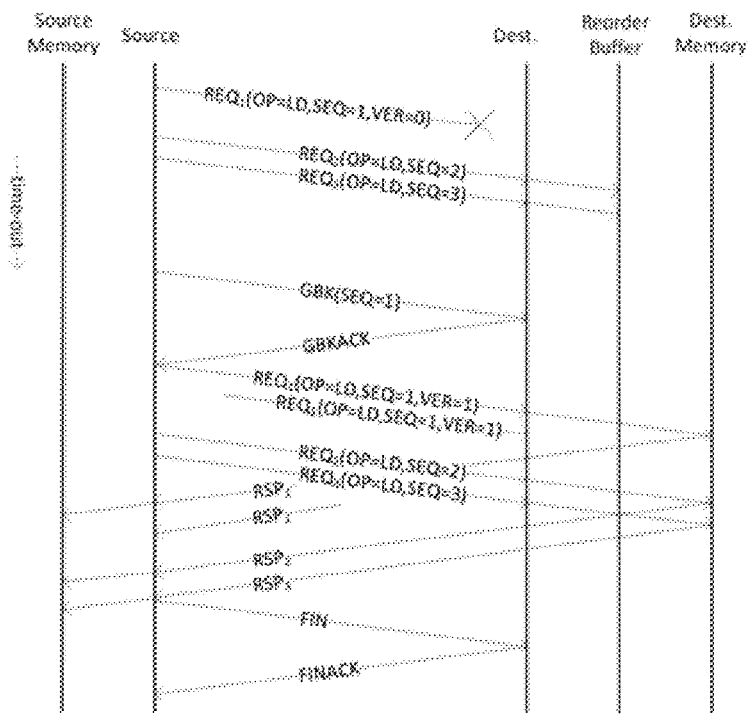
FIG. 19 depicts an example of network-generated duplicate packets.

FIG. 19 depicts an example of network-generated duplicate packets. The duplicate REQ1(VER=1) is removed by the destination-side deduplication filter and the duplicate RSP1 is removed by a (e.g., GPU) scoreboard.

Figure 20:
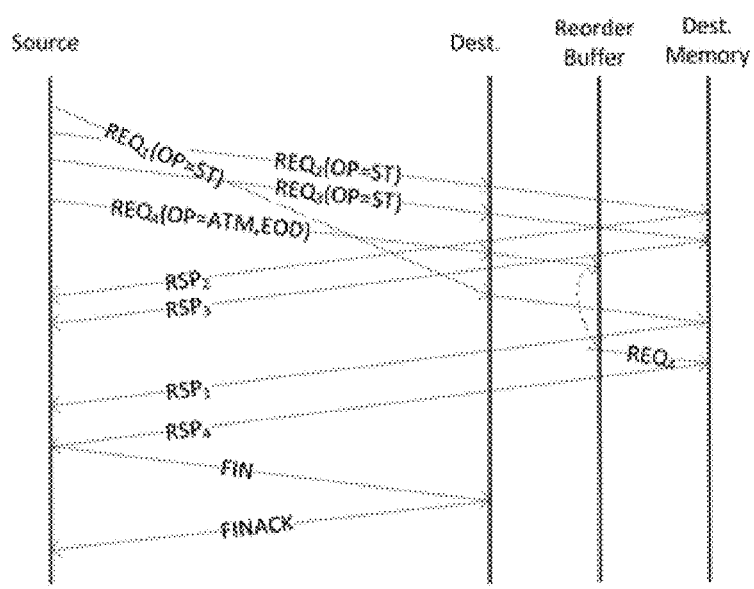
FIG. 20 depicts an example of synchronized transfer.

FIG. 20 depicts an example of synchronized transfer. A synchronized transfer (STR) comprises an unordered transfer of data packets followed by a synchronization operation. An STR implements destination-side synchronization thereby avoiding any RTT-delays between the end of the data transfer and the synchronization operation. In FIG. 20 there are three data packets REQ1 . . . 3 followed by a synchronization operation in REQ4. REQ1 . . . 3 are forwarded to destination memory in the order they arrive. REQ4 comprises the synchronization operation that requires EOD and should only be forwarded to destination memory after all data packets have been delivered. In the example, REQ4 arrives at the destination before all data packets are forwarded to destination memory and is, thus, temporarily kept in a reorder buffer until the data portion has completed.

Some bookkeeping is utilized to determine when the synchronization operation may be released. One scheme that may be utilized uses counted writes. A counter tracks the data packets at the destination to determine when the synchronization operation may be executed. The condition for executing the synchronization operation may be considered met when the counter has accounted for all data packets.

Figure 21:
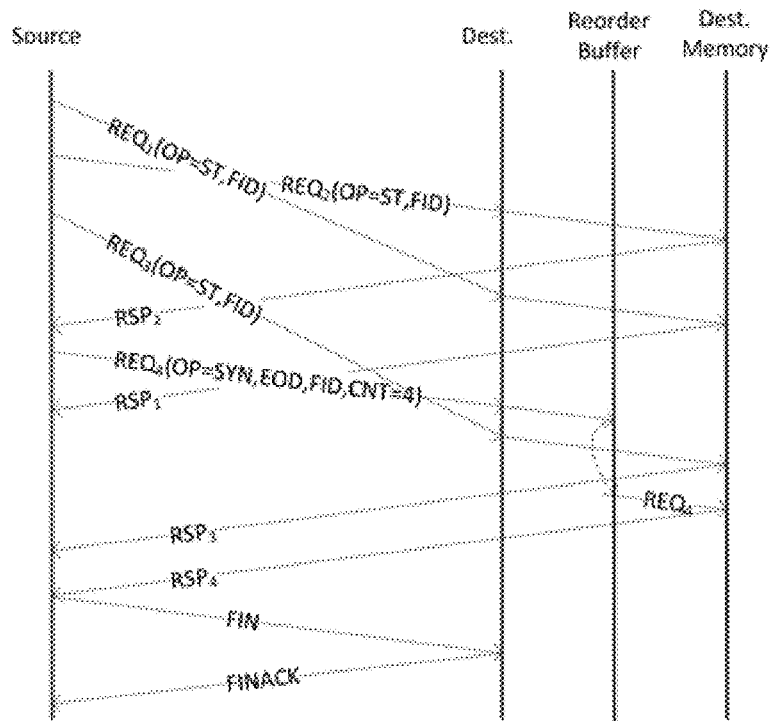
FIG. 21 depicts an example of synchronized transfer using a counter for tracking packets.

FIG. 21 depicts an example of synchronized transfer using a counter for tracking packets. An STR comprising three data packets REQ1 . . . 3 each for a store operation is followed by a synchronization packet REQ4 for the synchronization operation. REQ4 carries a count CNT=4 that specifies the total number of packets making up the STR. The destination counts the REQ packets and when the counter reaches CNT, the condition is met to forward and execute the synchronization operation. In the example, REQ1 and REQ3 arrive out-of-order. The order of the data packets REQ1 . . . 3 does not matter, so the destination forwards them to destination memory as they arrive. REQ4 with the synchronization operation, however, has to be ordered with respect to the data packets. Because it arrives out-of-order, it has to be stored in the reorder buffer until after the last data packet REQ3 is received.

The data and synchronization packets are associated with a flow identifier FID that both the source and destination use to keep track of the transfer. The flow state needed at the destination is the aforementioned packet counter. The destination opens a flow with the receipt of the first REQ which is REQ2 in the example. Flow state at both the source and destination is removed by the FIN/FINACK handshake. In FIG. 21, it is assumed that resources such as flow state and reorder buffer are available and not exhausted.

A robust STR protocol should include mechanisms to recover from transmission errors. Simply resending a REQ in response to a transmission error may be insufficient because the destination might count REQs more than once (if the RSP is lost) and thereby get out of sync. To avoid this, the 'go back' handshake introduced above may be utilized to reset the destination counter and resynchronize source and destination states.

Figure 22:
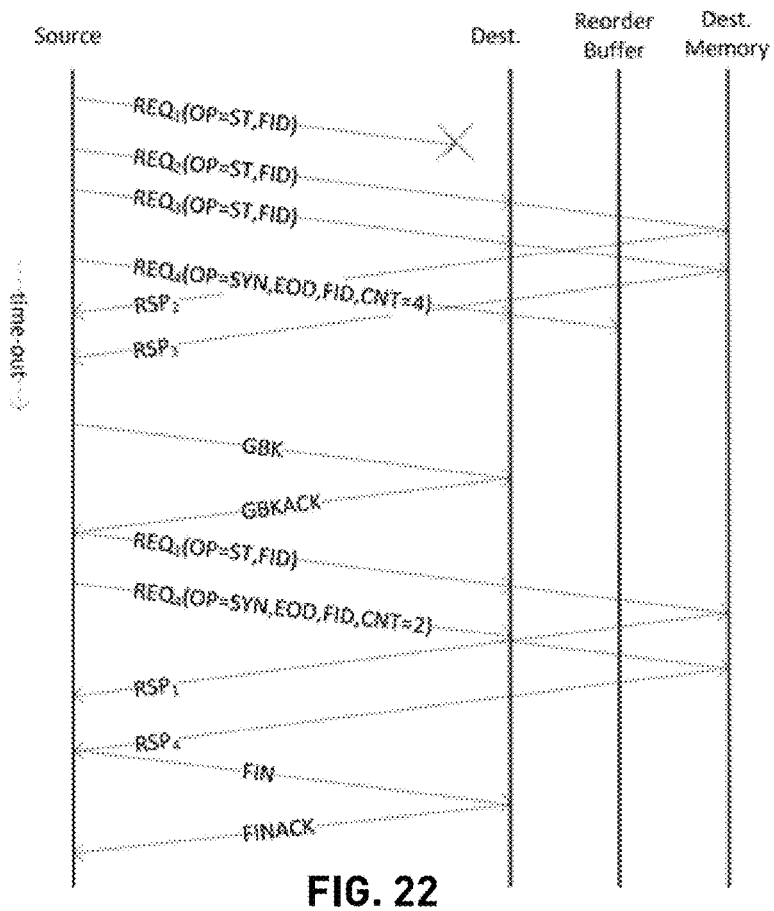
FIG. 22 depicts an example of a lost REQ packet.

FIG. 22 depicts an example of a lost REQ packet. A time-out timer is applied to detect the loss of packets. Before retransmission, a GBK/GBKACK exchange takes place that informs the destination to reset the packet counter to 0 (zero) and remove the synchronization operation from the reorder buffer if it already has been received.

The time-out timer may be implemented in a number of ways, for example:

1. Each REQ is associated with a time-out timer. The timer is started when the REQ is sent and it is stopped when the corresponding RSP is received. When a timer times out, an error occurred. No more REQs are sent and another timer is started that expires when it is guaranteed that no more RSPs may be received.
2. A single time-out timer is used that is reset whenever a REQ is sent. The timer is stopped when all RSPs have been received. When the timer times out, one or more of the REQ/RSP transactions have failed.

An advantage of the first option is that transmission errors are detected quicker than with the second option where an error will only be detected when the time-out timer expires that was reset when the last REQ was sent. On the other hand, the first option is more complex because it requires a time-out timer for each REQ whereas the second option only uses one timer. Some of the drawings that follow depict use of the second option. Time-out timers may also be used to capture errors that occur during the GBK/GBKACK and FIN/FINACK handshakes.

After the GBK/GBKACK handshake, transmission resumes. That is, packets that timed out and packets that have not already been sent, are sent. In the example, REQ1 is resent because it was lost on first try, as well as REQ4 with the synchronization operation because it was not ACKed. The count CNT in resent REQ4 has been adjusted to 2 to reflect the number of newly sent REQs.

Figure 23A:
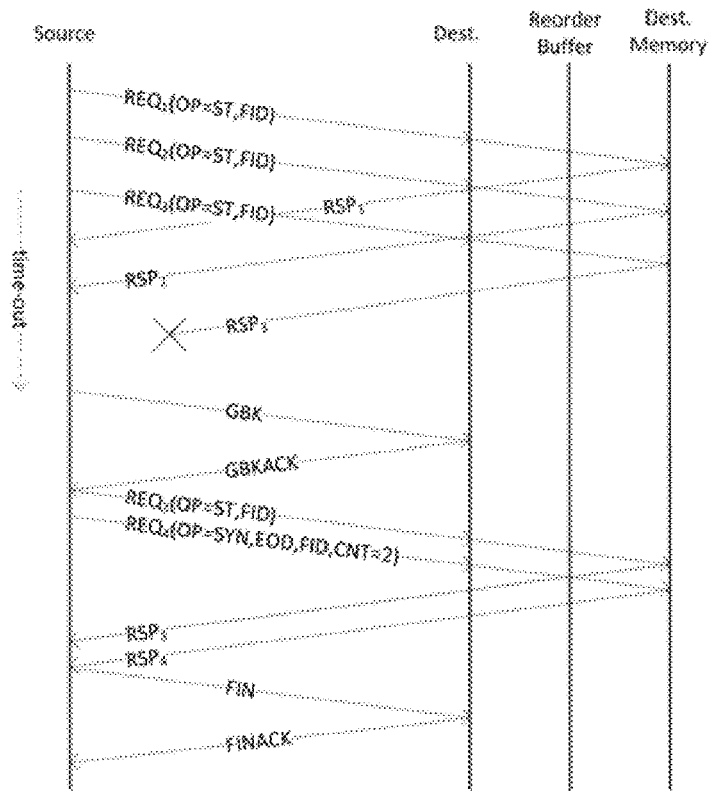
FIG. 23A depicts an example of RSP packet loss.
Figure 23B:
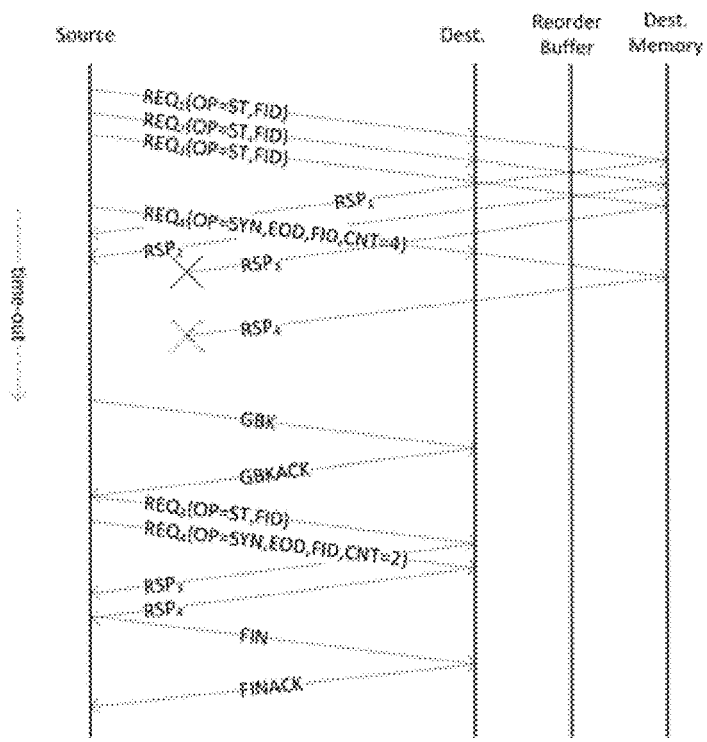
FIG. 23B depicts an example of a duplicate synchronization operation.
Figure 23C:
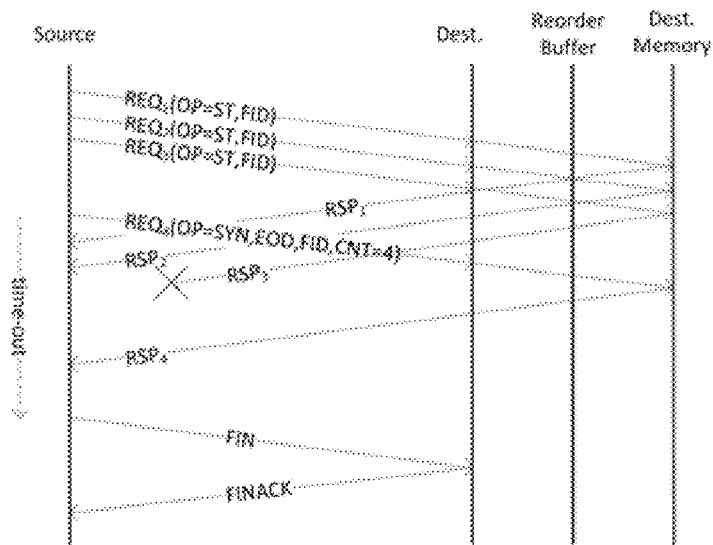
FIG. 23C depicts an example of RSP packet loss with no retransmission.

FIG. 23A-FIG. 23C depict scenarios where RSPs are lost. In FIG. 23A, RSP3 is lost. The time-out timer expires and triggers a 'go back' handshake. After GBK/GBKACK has completed, REQ3 is resent and the remaining REQ4 is sent. The resent REQ4 specifies CNT=2 reflecting the number of REQs sent after the 'go back' handshake.

In FIG. 23B, RSP3 as well as RSP4 are lost. Though the STR completed, the source is unaware of this fact and resends REQ3 and REQ4 after the 'go back' handshake. Because memory must not be modified after synchronization, the destination must not forward REQ3 and REQ4. This example demonstrates that deduplication is not only needed for the synchronization operation but also for any data packet that arrives after synchronization.

Another scenario with a lost RSP is shown in FIG. 23C. Here, data transfer REQ3/RSP3 fails. By the time the time-out timer has expired, RSP4 has arrived, acknowledging execution of the synchronization operation. Because the receipt of RSP4 indicates that the STR has completed, no retransmissions takes place.

Figure 24:
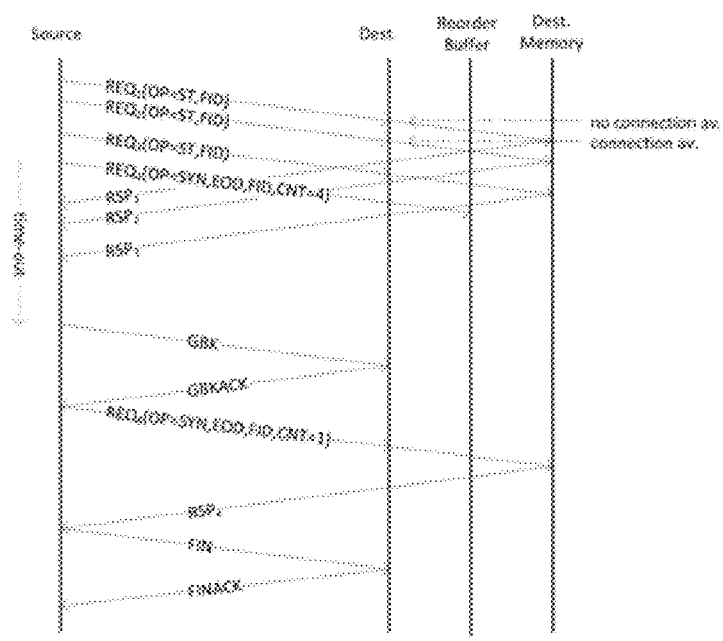
FIG. 24 depicts an example where no flow is available.

FIG. 24 depicts an example where no flow is available. As explained above, when the first packet of a flow arrives at the destination, a flow is opened. However, opening a flow is not possible if the destination has run out of resources. The resources necessary to open a flow include a counter for keeping track of the number of REQs received and, if the synchronization operation is fetching a value, a replay buffer. In FIG. 24, REQ1 is the first packet to arrive at the destination. At that time, a flow cannot be opened. Because REQ1 is a data packet, it may still be forwarded to destination memory. When REQ2 arrives next, a flow is opened. However, REQ1 was not counted and when REQ4 with the synchronization operation arrives, it is, as a result, stored in the reorder buffer. REQ4 will eventually time out and cause a 'go back' handshake. REQ4 is resent, now with CNT=1, and forwarded to destination memory.

Figure 25:
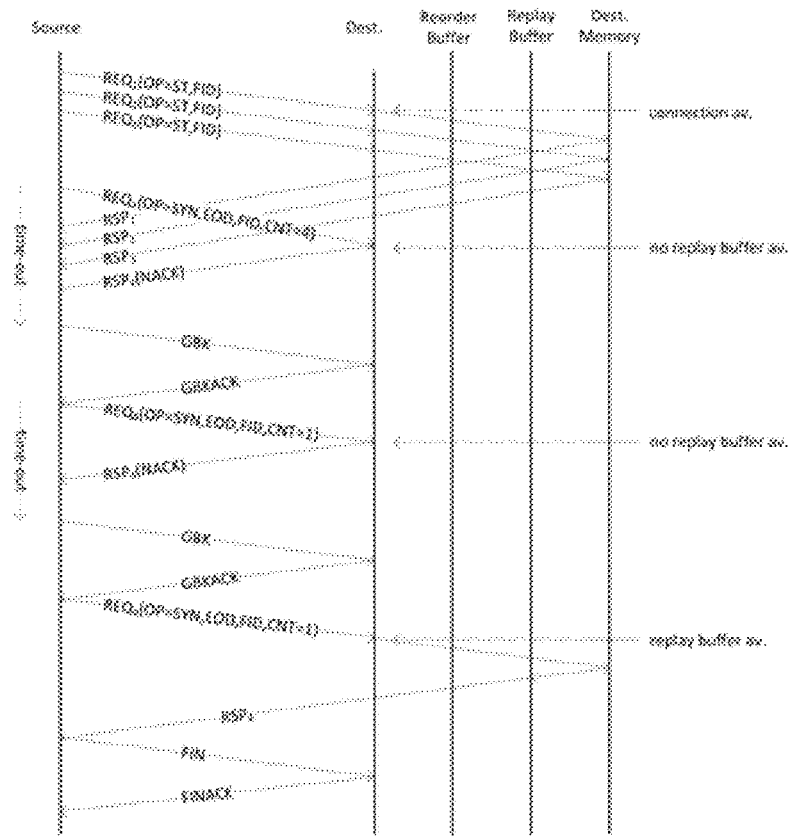
FIG. 25 depicts an example where no replay buffer is available.

If a replay buffer is needed, it may be allocated at the time the flow is opened or when the synchronization operation arrives at the destination. Considering the former solution, if no replay buffer is available, the flow is not opened. And in regard to the latter solution, if no replay buffer is available to store the fetched value, the REQ with the synchronization operation is NACKed and resent until a replay buffer becomes available. This latter solution is depicted in FIG. 25, a scenario in which no replay buffer is available. REQ4 with the synchronization operation is retried until a replay buffer has become available.

Figure 26:
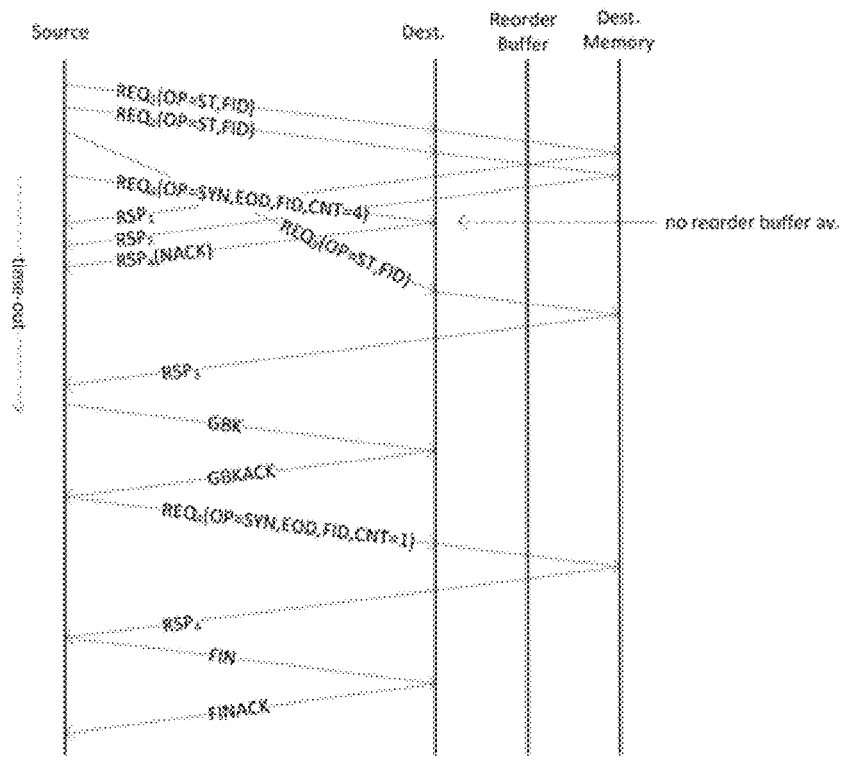
FIG. 26 depicts an example where no reorder buffer is available.

Another resource that may be exhausted is the reorder buffer. An example is depicted in FIG. 26. A reorder buffer is needed when REQ4 with the synchronization operation arrives at the destination before all data packets have been received. If no reorder buffer is available, the REQ is NACKed. This will cause a time-out and retransmission of REQ4. This case resembles the previous one where no replay buffer was available. When the source receives a NACK, it does not know which resource is missing. The difference is that no reorder buffer is needed to make progress, whereas a replay buffer is needed if the synchronization operation fetches a value.

Computing devices, such as central processing units and graphics processing units, implement a memory consistency model, which provides guarantees about the order in which a set of events appear to occur. A memory consistency model is conventionally a memory system implementation problem, because it requires the ordering of memory operations (loads and stores) within a chip. Some memory systems (e.g., Nvidia's NVLink and NVSwitch networked systems) extend the memory model across many computing devices by transporting memory operations over a packet switched network. As network systems scale from tens to thousands of endpoints, enforcing packet ordering in the network becomes onerous and reduces performance. If the network cannot guarantee packet ordering, it will violate the memory consistency model. Because enforcing ordering in the network reduces performance, endpoint devices (the final target of transported memory operations) may reorder packets to enforce a memory consistency model. To reorder packets, an endpoint puts a packet in a reorder buffer until all other relevant packets arrive, and the endpoint appropriately reorders the packets according to the memory consistency model.

A history filter may be utilized at each endpoint to identify recently received packets. When the first packet in a flow arrives at an endpoint, the endpoint allocates an entry in the history filter. The endpoint does not know at this juncture whether the packet is a singleton or the first packet of a longer flow. If the packet is a singleton, it will be evicted from the history filter after the timeout period elapses. If the packet is the first of multiple packets in a longer flow, a subsequent (to the first) packet in the flow will eventually arrive at the endpoint, and in response the endpoint will establish a flow by looking up the first packet of the flow in the history filter. However, this will not happen if the latency between the first packet and the second packet is longer than the eviction deadline for the history filter.

The history filter uniquely identifies a flow based on a source identifier (e.g., source endpoint) and flow identifier (e.g., memory address). The history filter may be implemented as a small cache of recently accessed arrived packets. Packets remain in the history filter for a preset duration and then are evicted. If the second packet, i.e., packet B, of a flow arrives and the first packet, packet A, was evicted, packet B exists without context of whether packet A arrived or not. In this scenario packet B would be maintained in the history filter awaiting the arrival of packet A, which has already arrived and been evicted from the history filter. No flow is established. This eventually triggers an error recovery mechanism that determines the correct order of events but wastes bandwidth and time.

A "fast path" mechanism may be utilized to reduce the probability that a history filter evicts an entry when subsequent packets are still in the network. This prevents the chance of an eviction from the history filter that leads to undesirable retransmission(s).

As explained above, a large skew between packets within the same flow may result in unnecessary retransmissions when the history filter evicts a flow before other packets of the flow arrive. To reduce skew between packets that need to be ordered, mechanisms may be implemented to "fast path" the second packet in a flow. The second packet establishes a flow at the destination, where flows are evicted after a predetermined amount of time. By "fast pathing" a packet, it will traverse the network quickly, thereby reducing the likelihood that the packet arrives after the history filter evicts the first packet in the flow.

By limiting the latency of packets that establish flows, the system may more rapidly evict singletons from the history filter or move them to the reorder buffer. In conventional approaches, limiting the latency of flow-establishing packets may involve limiting the amount of traffic in the network. Most latency in a network may result from packet queueing delays, and limiting the amount of traffic limits the amount of queueing delay because the size of queues are bounded by the number of in-flight packets. Limiting the amount of traffic negatively impacts the throughput of the network. By limiting the number of packets that each end-host can inject, the end-hosts cannot saturate the network, which reduces the overall throughput of the network. This means that for some applications reducing the network throughput to reduce packet latencies is not an option.

In one embodiment mechanisms are utilized to reduce and/or bound the latency of packets having a sequence number of two (2), which enables the network to maintain a high throughput and reduce/limit the size of buffers. The second packet in a sequence establishes a flow. If the second packet is guaranteed to arrive within a certain bound, singletons can be evicted from the history filter quickly because either the second packet in the flow arrives, or the first packet is identifiable as a singleton and not part of a longer flow.

In one embodiment, each sender is limited in a number of outstanding packets they may have on the "fast path". Algorithms are known in the art for determining a number of outstanding packets each sender can have and maintain a latency bound on packets: See for example GROSVENOR, M. P., SCHWARZKOPF, M., GOG, I., WATSON, R. N., MOORE, A. W., HAND, S., AND CROWCROFT, J. Queues don't matter when you can {JUMP} them!, 12th {USENIX} Symposium on Networked Systems Design and Implementation ({NSDI} 15) (2015), pp. 1-14. The bound on the number of outstanding packets directly correlates to the size of the history filter resources. If the bound is lowered, less resources need to be allocated to the history filter.

In one embodiment, virtual channels are utilized to implement a "fast path". Virtual channels enable separate and more fine-grained queueing control for different types of network traffic. Each packet may be assigned a virtual channel, and the packet consumes resources for its assigned virtual channel. Switches may arbitrate between virtual channels using a bandwidth allocation policy. In one embodiment, the fast path utilizes Strict Priority Queueing and assigns one virtual channel that preempts traffic on any other virtual channel. This enables the packet on the virtual channel fast path to skip packet queues and arrive at the destination with lower latency. Packets arriving quickly enable the destination to evict singletons from the history filter quickly, which reduces the required history filter size.

As noted above, access to the "fast path" may be restricted, so the fast path does not also become congested. Some embodiments may utilize multiple "fast paths" of different priorities, each of which may preempt a lower priority fast path in congestion/collision situations.

In some embodiments, a fast path may be implemented using age based arbitration. Age based arbitration sorts packets by their age. The older a packet is, the higher priority it is. By setting the age of packets that establish flows to a very large value, or to infinity, the packet may be moved quickly through the network, ahead of other packets with lower ages. By restricting the number of outstanding packets each sender may send with a high age, the latency of packets that establish flows is well-defined and bounded.

Conventional techniques for enforcing quality-of-service preferences in interconnection networks may also be utilized to implement a fast path for flow establishing packets.

Figure 27:
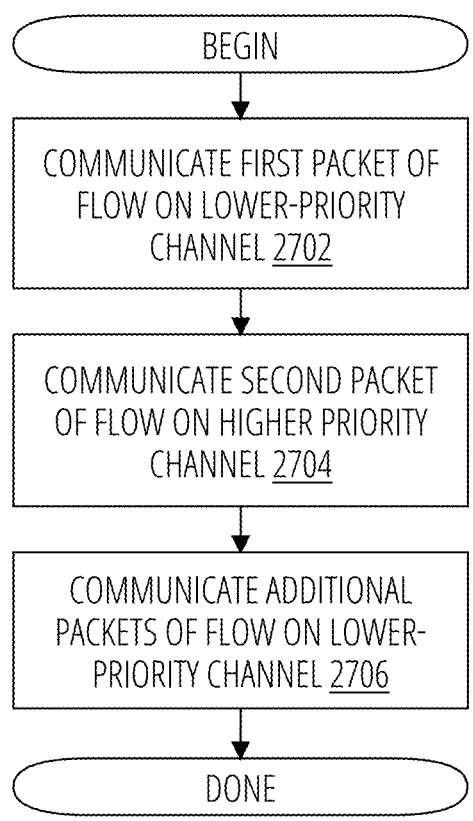
FIG. 27 depicts an embodiment of a process of fast pathing to reduce the probability of packet retransmissions.

FIG. 27 depicts an embodiment of a process of fast pathing to reduce the probability of packet retransmissions. At block 2702, a first packet of flow is communicated on a lower-priority channel. In block 2704, a second packet of the flow is communicated on a higher priority channel. The second packet establishes a flow at the destination. Additional packets of the flow are communicated on the lower-priority channel (block 2706). The second packet that establishes the flow traverses the network with lower latency than in conventional approaches, thereby reducing the likelihood that the flow-establishing packet arrives after the history filter evicts the first packet in the flow, and also enabling earlier eviction of singletons, reducing the necessary history filter size in the receiver.

The protocol features disclosed herein may be implemented in computing devices utilizing one or more graphic processing unit (GPU) and/or general purpose data processor (e.g., a 'central processing unit or CPU). Exemplary architectures will now be described that may be configured to carry out the techniques disclosed herein on such devices.

The following description may use certain acronyms and abbreviations as follows:
 "DPC" refers to a "data processing cluster";
 "GPC" refers to a "general processing cluster";
 "I/O" refers to a "input/output";
 "L1 cache" refers to "level one cache";
 "L2 cache" refers to "level two cache";
 "LSU" refers to a "load/store unit";
 "MMU" refers to a "memory management unit";
 "MPC" refers to an "M-pipe controller";
 "PPU" refers to a "parallel processing unit";
 "PROP" refers to a "pre-raster operations unit";
 "ROP" refers to a "raster operations";
 "SFU" refers to a "special function unit";
 "SM" refers to a "streaming multiprocessor";
 "Viewport SCC" refers to "viewport scale, cull, and clip";
 "WDX" refers to a "work distribution crossbar"; and
 "XBar" refers to a "crossbar".

Parallel Processing Unit

Figure 28:
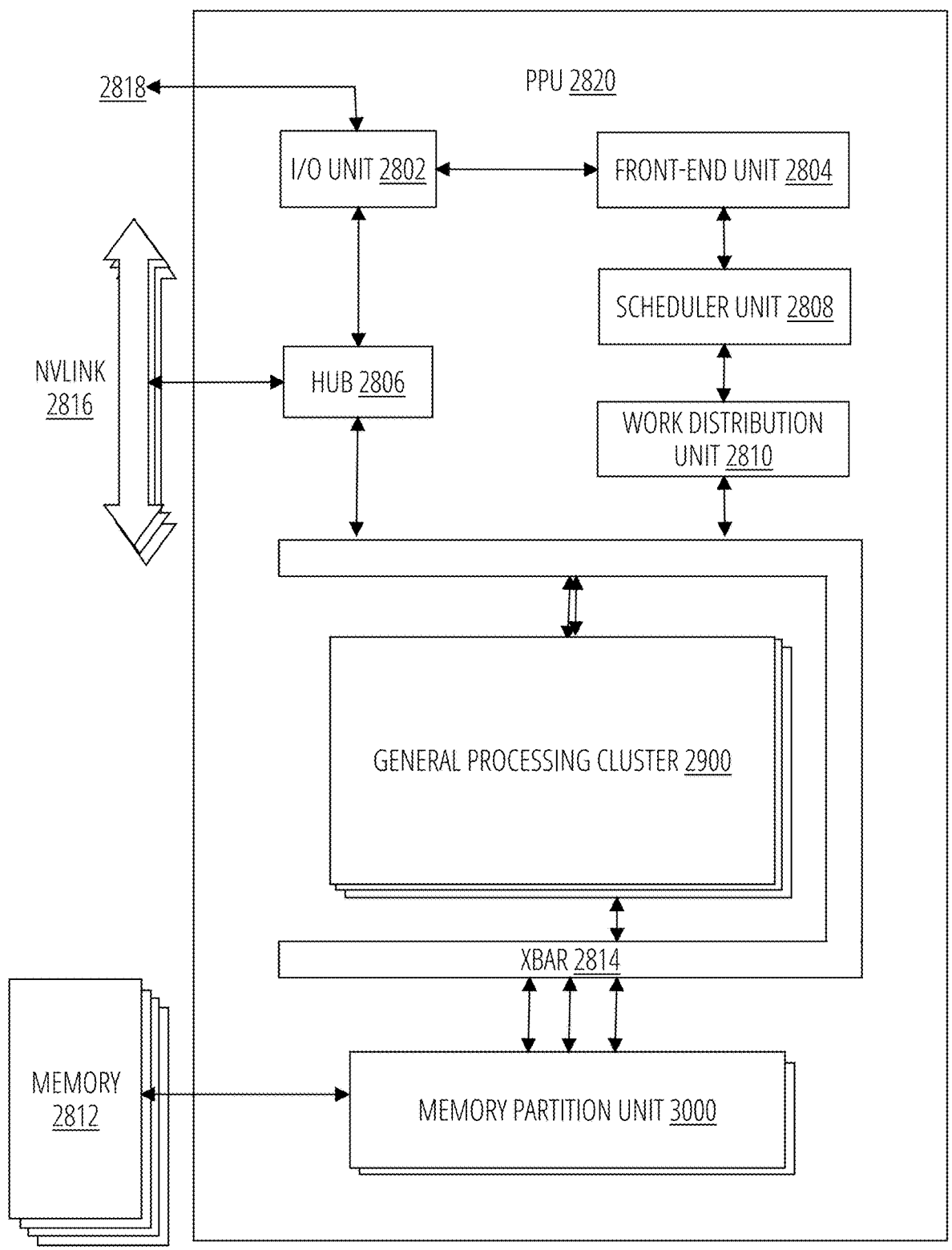
FIG. 28 depicts a parallel processing unit 2820 in accordance with one embodiment.

FIG. 28 depicts a parallel processing unit 2820, in accordance with an embodiment. In an embodiment, the parallel processing unit 2820 is a multi-threaded processor that is implemented on one or more integrated circuit devices. The parallel processing unit 2820 is a latency hiding architecture designed to process many threads in parallel. A thread (e.g., a thread of execution) is an instantiation of a set of instructions configured to be executed by the parallel processing unit 2820. In an embodiment, the parallel processing unit 2820 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 2820 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 2820 modules may be configured to accelerate thousands of High Performance Computing (HPC), data center, and machine learning applications. The parallel processing unit 2820 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 28, the parallel processing unit 2820 includes an I/O unit 2802, a front-end unit 2804, a scheduler unit 2808, a work distribution unit 2810, a hub 2806, a crossbar 2814, one or more general processing cluster 2900 modules, and one or more memory partition unit 3000 modules. The parallel processing unit 2820 may be connected to a host processor or other parallel processing unit 2820 modules via one or more high-speed NVLink 2816 interconnects. Embodiments of the protocols described herein may be implemented for communication between various components of the parallel processing unit 2820 over the NVLinks 2816 and/or the crossbar 2814.

The parallel processing unit 2820 may be connected to a host processor or other peripheral devices via an interconnect 2818. The parallel processing unit 2820 may also be connected to a local memory comprising a number of memory 2812 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 2812 may comprise logic to configure the parallel processing unit 2820 to carry out aspects of the techniques disclosed herein.

The NVLink 2816 interconnect enables systems to scale and include one or more parallel processing unit 2820 modules combined with one or more CPUs, supports cache coherence between the parallel processing unit 2820 modules and CPUs, and CPU mastering. Data and/or commands may be transmitted by the NVLink 2816 through the hub 2806 to/from other units of the parallel processing unit 2820 such as one or more copy engines, a video encoder, a video decoder, a power management unit, etc. (not explicitly shown). The NVLink 2816 is described in more detail in conjunction with FIG. 32.

The I/O unit 2802 is configured to transmit and receive communications (e.g., commands, data, etc.) from a host processor (not shown) over the interconnect 2818. The I/O unit 2802 may communicate with the host processor directly via the interconnect 2818 or through one or more intermediate devices such as a memory bridge. In an embodiment, the I/O unit 2802 may communicate with one or more other processors, such as one or more parallel processing unit 2820 modules via the interconnect 2818. In an embodiment, the I/O unit 2802 implements a Peripheral Component Interconnect Express (PCIe) interface for communications over a PCIe bus and the interconnect 2818 is a PCIe bus. In alternative embodiments, the I/O unit 2802 may implement other types of well-known interfaces for communicating with external devices.

The I/O unit 2802 decodes packets received via the interconnect 2818. In an embodiment, the packets represent commands configured to cause the parallel processing unit 2820 to perform various operations. The I/O unit 2802 transmits the decoded commands to various other units of the parallel processing unit 2820 as the commands may specify. For example, some commands may be transmitted to the front-end unit 2804. Other commands may be transmitted to the hub 2806 or other units of the parallel processing unit 2820 such as one or more copy engines, a video encoder, a video decoder, a power management unit, etc. (not explicitly shown). In other words, the I/O unit 2802 is configured to route communications between and among the various logical units of the parallel processing unit 2820.

In an embodiment, a program executed by the host processor encodes a command stream in a buffer that provides workloads to the parallel processing unit 2820 for processing. A workload may comprise several instructions and data to be processed by those instructions. The buffer is a region in a memory that is accessible (e.g., read/write) by both the host processor and the parallel processing unit 2820. For example, the I/O unit 2802 may be configured to access the buffer in a system memory connected to the interconnect 2818 via memory requests transmitted over the interconnect 2818. In an embodiment, the host processor writes the command stream to the buffer and then transmits a pointer to the start of the command stream to the parallel processing unit 2820. The front-end unit 2804 receives pointers to one or more command streams. The front-end unit 2804 manages the one or more streams, reading commands from the streams and forwarding commands to the various units of the parallel processing unit 2820.

The front-end unit 2804 is coupled to a scheduler unit 2808 that configures the various general processing cluster 2900 modules to process tasks defined by the one or more streams. The scheduler unit 2808 is configured to track state information related to the various tasks managed by the scheduler unit 2808. The state may indicate which general processing cluster 2900 a task is assigned to, whether the task is active or inactive, a priority level associated with the task, and so forth. The scheduler unit 2808 manages the execution of a plurality of tasks on the one or more general processing cluster 2900 modules.

The scheduler unit 2808 is coupled to a work distribution unit 2810 that is configured to dispatch tasks for execution on the general processing cluster 2900 modules. The work distribution unit 2810 may track a number of scheduled tasks received from the scheduler unit 2808. In an embodiment, the work distribution unit 2810 manages a pending task pool and an active task pool for each of the general processing cluster 2900 modules. The pending task pool may comprise a number of slots (e.g., 32 slots) that contain tasks assigned to be processed by a particular general processing cluster 2900. The active task pool may comprise a number of slots (e.g., 4 slots) for tasks that are actively being processed by the general processing cluster 2900 modules. As a general processing cluster 2900 finishes the execution of a task, that task is evicted from the active task pool for the general processing cluster 2900 and one of the other tasks from the pending task pool is selected and scheduled for execution on the general processing cluster 2900. If an active task has been idle on the general processing cluster 2900, such as while waiting for a data dependency to be resolved, then the active task may be evicted from the general processing cluster 2900 and returned to the pending task pool while another task in the pending task pool is selected and scheduled for execution on the general processing cluster 2900.

The work distribution unit 2810 communicates with the one or more general processing cluster 2900 modules via crossbar 2814. The crossbar 2814 is an interconnect network that couples many of the units of the parallel processing unit 2820 to other units of the parallel processing unit 2820. For example, the crossbar 2814 may be configured to couple the work distribution unit 2810 to a particular general processing cluster 2900. Although not shown explicitly, one or more other units of the parallel processing unit 2820 may also be connected to the crossbar 2814 via the hub 2806.

The tasks are managed by the scheduler unit 2808 and dispatched to a general processing cluster 2900 by the work distribution unit 2810. The general processing cluster 2900 is configured to process the task and generate results. The results may be consumed by other tasks within the general processing cluster 2900, routed to a different general processing cluster 2900 via the crossbar 2814, or stored in the memory 2812. The results can be written to the memory 2812 via the memory partition unit 3000 modules, which implement a memory interface for reading and writing data to/from the memory 2812. The results can be transmitted to another parallel processing unit 2820 or CPU via the NVLink 2816. In an embodiment, the parallel processing unit 2820 includes a number U of memory partition unit 3000 modules that is equal to the number of separate and distinct memory 2812 devices coupled to the parallel processing unit 2820. A memory partition unit 3000 will be described in more detail below in conjunction with FIG. 30.

In an embodiment, a host processor executes a driver kernel that implements an application programming interface (API) that enables one or more applications executing on the host processor to schedule operations for execution on the parallel processing unit 2820. In an embodiment, multiple compute applications are simultaneously executed by the parallel processing unit 2820 and the parallel processing unit 2820 provides isolation, quality of service (QoS), and independent address spaces for the multiple compute applications. An application may generate instructions (e.g., API calls) that cause the driver kernel to generate one or more tasks for execution by the parallel processing unit 2820. The driver kernel outputs tasks to one or more streams being processed by the parallel processing unit 2820. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 31.

Figure 29:
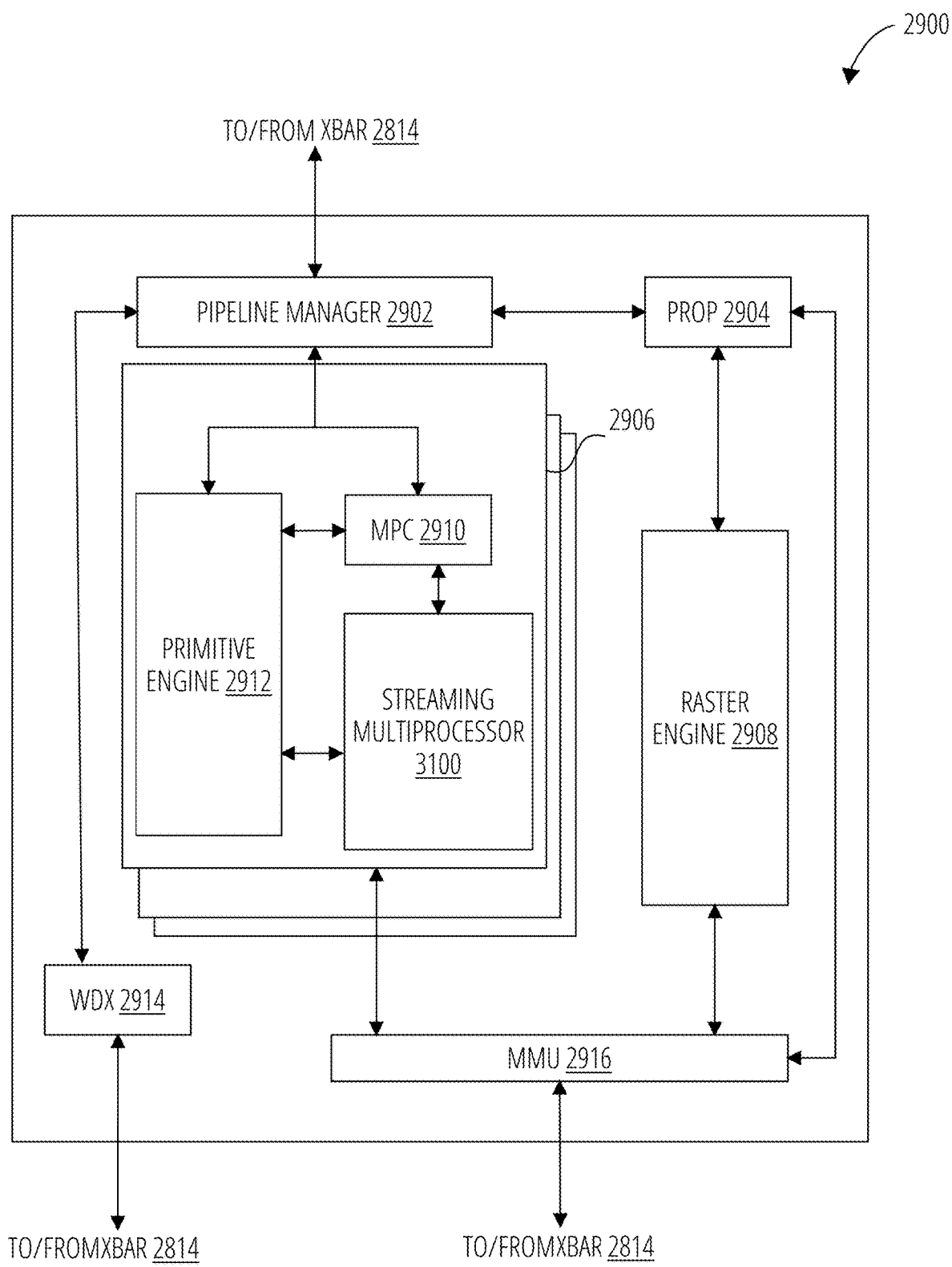
FIG. 29 depicts a general processing cluster 2900 in accordance with one embodiment.

FIG. 29 depicts a general processing cluster 2900 of the parallel processing unit 2820 of FIG. 28, in accordance with an embodiment. As shown in FIG. 29, each general processing cluster 2900 includes a number of hardware units for processing tasks. In an embodiment, each general processing cluster 2900 includes a pipeline manager 2902, a pre-raster operations unit 2904, a raster engine 2908, a work distribution crossbar 2914, a memory management unit 2916, and one or more data processing cluster 2906. It will be appreciated that the general processing cluster 2900 of FIG. 29 may include other hardware units in lieu of or in addition to the units shown in FIG. 29.

In an embodiment, the operation of the general processing cluster 2900 is controlled by the pipeline manager 2902. The pipeline manager 2902 manages the configuration of the one or more data processing cluster 2906 modules for processing tasks allocated to the general processing cluster 2900. In an embodiment, the pipeline manager 2902 may configure at least one of the one or more data processing cluster 2906 modules to implement at least a portion of a graphics rendering pipeline. For example, a data processing cluster 2906 may be configured to execute a vertex shader program on the programmable streaming multiprocessor 3100. The pipeline manager 2902 may also be configured to route packets received from the work distribution unit 2810 to the appropriate logical units within the general processing cluster 2900. For example, some packets may be routed to fixed function hardware units in the pre-raster operations unit 2904 and/or raster engine 2908 while other packets may be routed to the data processing cluster 2906 modules for processing by the primitive engine 2912 or the streaming multiprocessor 3100. In an embodiment, the pipeline manager 2902 may configure at least one of the one or more data processing cluster 2906 modules to implement a neural network model and/or a computing pipeline.

Figure 30:
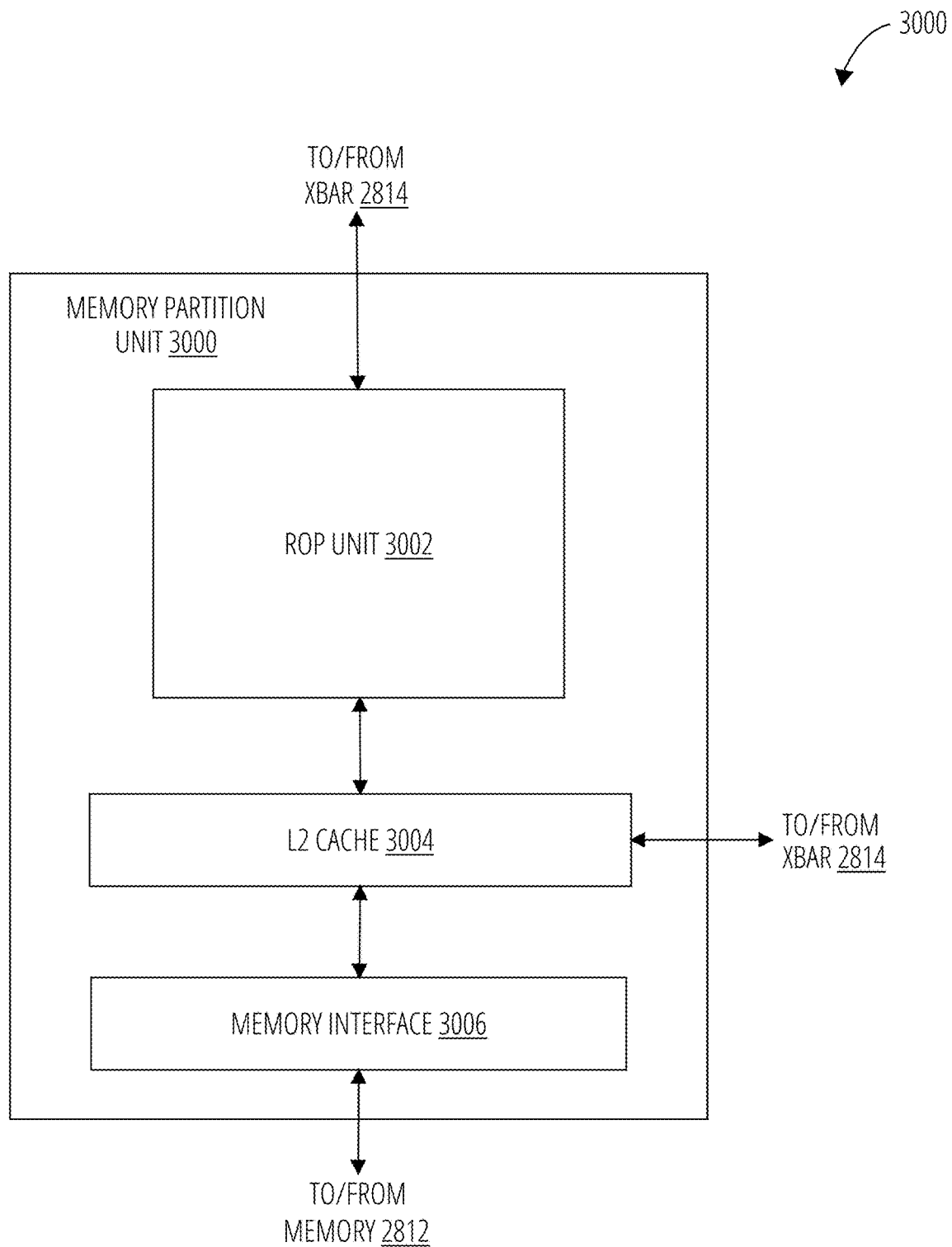
FIG. 30 depicts a memory partition unit 3000 in accordance with one embodiment.

The pre-raster operations unit 2904 is configured to route data generated by the raster engine 2908 and the data processing cluster 2906 modules to a Raster Operations (ROP) unit, described in more detail in conjunction with FIG. 30. The pre-raster operations unit 2904 may also be configured to perform optimizations for color blending, organize pixel data, perform address translations, and the like.

The raster engine 2908 includes a number of fixed function hardware units configured to perform various raster operations. In an embodiment, the raster engine 2908 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 2908 comprises fragments to be processed, for example, by a fragment shader implemented within a data processing cluster 2906.

Each data processing cluster 2906 included in the general processing cluster 2900 includes an M-pipe controller 2910, a primitive engine 2912, and one or more streaming multiprocessor 3100 modules. The M-pipe controller 2910 controls the operation of the data processing cluster 2906, routing packets received from the pipeline manager 2902 to the appropriate units in the data processing cluster 2906. For example, packets associated with a vertex may be routed to the primitive engine 2912, which is configured to fetch vertex attributes associated with the vertex from the memory 2812. In contrast, packets associated with a shader program may be transmitted to the streaming multiprocessor 3100.

The streaming multiprocessor 3100 comprises a programmable streaming processor that is configured to process tasks represented by a number of threads. Each streaming multiprocessor 3100 is multi-threaded and configured to execute a plurality of threads (e.g., 32 threads) from a particular group of threads concurrently. In an embodiment, the streaming multiprocessor 3100 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 3100 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 3100 will be described in more detail below in conjunction with FIG. 31.

The memory management unit 2916 provides an interface between the general processing cluster 2900 and the memory partition unit 3000. The memory management unit 2916 may provide translation of virtual addresses into physical addresses, memory protection, and arbitration of memory requests. In an embodiment, the memory management unit 2916 provides one or more translation lookaside buffers (TLBs) for performing translation of virtual addresses into physical addresses in the memory 2812.

FIG. 30 depicts a memory partition unit 3000 of the parallel processing unit 2820 of FIG. 28, in accordance with an embodiment. As shown in FIG. 30, the memory partition unit 3000 includes a raster operations unit 3002, a level two cache 3004, and a memory interface 3006. The memory interface 3006 is coupled to the memory 2812. Memory interface 3006 may implement 32, 64, 128, 1024-bit data buses, or the like, for high-speed data transfer. In an embodiment, the parallel processing unit 2820 incorporates U memory interface 3006 modules, one memory interface 3006 per pair of memory partition unit 3000 modules, where each pair of memory partition unit 3000 modules is connected to a corresponding memory 2812 device. For example, parallel processing unit 2820 may be connected to up to Y memory 2812 devices, such as high bandwidth memory stacks or graphics double-data-rate, version 5, synchronous dynamic random access memory, or other types of persistent storage.

In an embodiment, the memory interface 3006 implements an HBM2 memory interface and Y equals half U. In an embodiment, the HBM2 memory stacks are located on the same physical package as the parallel processing unit

2820, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 2812 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 2820 modules process very large datasets and/or run applications for extended periods.

In an embodiment, the parallel processing unit 2820 implements a multi-level memory hierarchy. In an embodiment, the memory partition unit 3000 supports a unified memory to provide a single unified virtual address space for CPU and parallel processing unit 2820 memory, enabling data sharing between virtual memory systems. In an embodiment the frequency of accesses by a parallel processing unit 2820 to memory located on other processors is traced to ensure that memory pages are moved to the physical memory of the parallel processing unit 2820 that is accessing the pages more frequently. In an embodiment, the NVLink 2816 supports address translation services allowing the parallel processing unit 2820 to directly access a CPU's page tables and providing full access to CPU memory by the parallel processing unit 2820.

In an embodiment, copy engines transfer data between multiple parallel processing unit 2820 modules or between parallel processing unit 2820 modules and CPUs. The copy engines can generate page faults for addresses that are not mapped into the page tables. The memory partition unit 3000 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 2812 or other system memory may be fetched by the memory partition unit 3000 and stored in the level two cache 3004, which is located on-chip and is shared between the various general processing cluster 2900 modules. As shown, each memory partition unit 3000 includes a portion of the level two cache 3004 associated with a corresponding memory 2812 device. Lower level caches may then be implemented in various units within the general processing cluster 2900 modules. For example, each of the streaming multiprocessor 3100 modules may implement an L1 cache. The L1 cache is private memory that is dedicated to a particular streaming multiprocessor 3100. Data from the level two cache 3004 may be fetched and stored in each of the L1 caches for processing in the functional units of the streaming multiprocessor 3100 modules. The level two cache 3004 is coupled to the memory interface 3006 and the crossbar 2814.

The raster operations unit 3002 performs graphics raster operations related to pixel color, such as color compression, pixel blending, and the like. The raster operations unit 3002 also implements depth testing in conjunction with the raster engine 2908, receiving a depth for a sample location associated with a pixel fragment from the culling engine of the raster engine 2908. The depth is tested against a corresponding depth in a depth buffer for a sample location associated with the fragment. If the fragment passes the depth test for the sample location, then the raster operations unit 3002 updates the depth buffer and transmits a result of the depth test to the raster engine 2908. It will be appreciated that the number of partition memory partition unit 3000 modules may be different than the number of general processing cluster 2900 modules and, therefore, each raster operations unit 3002 may be coupled to each of the general processing cluster 2900 modules. The raster operations unit 3002 tracks packets received from the different general processing cluster 2900 modules and determines which general processing cluster 2900 that a result generated by the raster operations unit 3002 is routed to through the crossbar 2814. Although the raster operations unit 3002 is included within the memory partition unit 3000 in FIG. 30, in other embodiment, the raster operations unit 3002 may be outside of the memory partition unit 3000. For example, the raster operations unit 3002 may reside in the general processing cluster 2900 or another unit.

Figure 31:
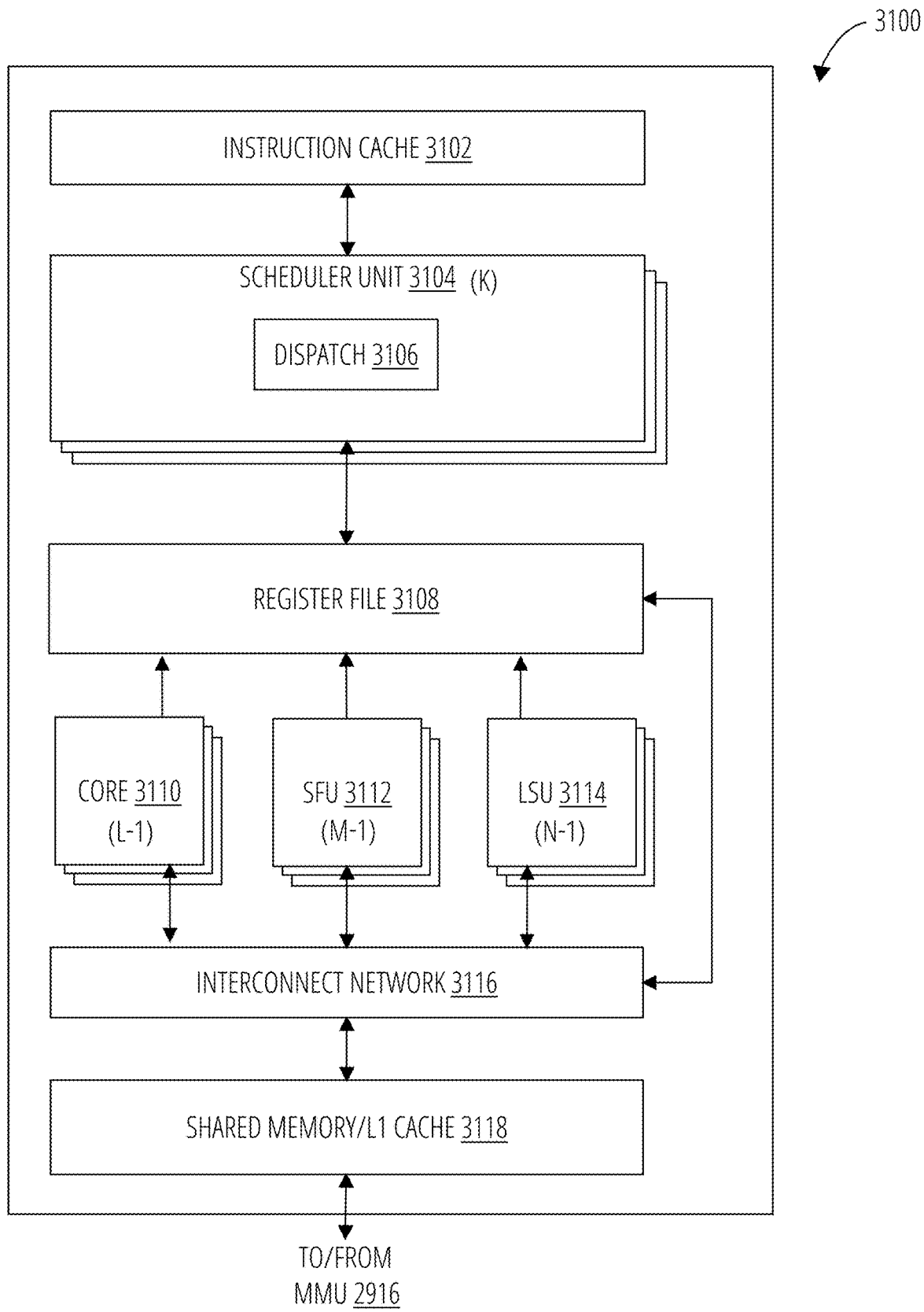
FIG. 31 depicts a streaming multiprocessor 3100 in accordance with one embodiment.

FIG. 31 illustrates the streaming multiprocessor 3100 of FIG. 29, in accordance with an embodiment. As shown in FIG. 31, the streaming multiprocessor 3100 includes an instruction cache 3102, one or more scheduler unit 3104 modules (e.g., such as scheduler unit 2808), a register file 3108, one or more processing core 3110 modules, one or more special function unit 3112 modules, one or more load/store unit 3114 modules, an interconnect network 3116, and a shared memory/L1 cache 3118. Embodiments of the protocols described herein may be implemented for communication between various components of the streaming multiprocessor 3100 over the interconnect network 3116.

As described above, the work distribution unit 2810 dispatches tasks for execution on the general processing cluster 2900 modules of the parallel processing unit 2820. The tasks are allocated to a particular data processing cluster 2906 within a general processing cluster 2900 and, if the task is associated with a shader program, the task may be allocated to a streaming multiprocessor 3100. The scheduler unit 2808 receives the tasks from the work distribution unit 2810 and manages instruction scheduling for one or more thread blocks assigned to the streaming multiprocessor 3100. The scheduler unit 3104 schedules thread blocks for execution as warps of parallel threads, where each thread block is allocated at least one warp. In an embodiment, each warp executes 32 threads. The scheduler unit 3104 may manage a plurality of different thread blocks, allocating the warps to the different thread blocks and then dispatching instructions from the plurality of different cooperative groups to the various functional units (e.g., core 3110 modules, special function unit 3112 modules, and load/store unit 3114 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 3106 unit is configured within the scheduler unit 3104 to transmit instructions to one or more of the functional units. In one embodiment, the scheduler unit 3104 includes two dispatch 3106 units that enable two different instructions from the same warp to be dispatched during each clock cycle. In alternative embodiments, each scheduler unit 3104 may include a single dispatch 3106 unit or additional dispatch 3106 units.

Each streaming multiprocessor 3100 includes a register file 3108 that provides a set of registers for the functional units of the streaming multiprocessor 3100. In an embodiment, the register file 3108 is divided between each of the functional units such that each functional unit is allocated a dedicated portion of the register file 3108. In another embodiment, the register file 3108 is divided between the different warps being executed by the streaming multiprocessor 3100. The register file 3108 provides temporary storage for operands connected to the data paths of the functional units.

Each streaming multiprocessor 3100 comprises L processing core 3110 modules. In an embodiment, the streaming multiprocessor 3100 includes a large number (e.g., 128, etc.) of distinct processing core 3110 modules. Each core 3110 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 3110 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 3110 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A'B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 3100 also comprises M special function unit 3112 modules that perform special functions (e.g., attribute evaluation, reciprocal square root, and the like). In an embodiment, the special function unit 3112 modules may include a tree traversal unit configured to traverse a hierarchical tree data structure. In an embodiment, the special function unit 3112 modules may include texture unit configured to perform texture map filtering operations. In an embodiment, the texture units are configured to load texture maps (e.g., a 2D array of texels) from the memory 2812 and sample the texture maps to produce sampled texture values for use in shader programs executed by the streaming multiprocessor 3100. In an embodiment, the texture maps are stored in the shared memory/L1 cache 3118. The texture units implement texture operations such as filtering operations using mip-maps (e.g., texture maps of varying levels of detail). In an embodiment, each streaming multiprocessor 3100 includes two texture units.

Each streaming multiprocessor 3100 also comprises N load/store unit 3114 modules that implement load and store operations between the shared memory/L1 cache 3118 and the register file 3108. Each streaming multiprocessor 3100 includes an interconnect network 3116 that connects each of the functional units to the register file 3108 and the load/store unit 3114 to the register file 3108 and shared memory/L1 cache 3118. In an embodiment, the interconnect network 3116 is a crossbar that can be configured to connect any of the functional units to any of the registers in the register file 3108 and connect the load/store unit 3114 modules to the register file 3108 and memory locations in shared memory/L1 cache 3118.

The shared memory/L1 cache 3118 is an array of on-chip memory that allows for data storage and communication between the streaming multiprocessor 3100 and the primitive engine 2912 and between threads in the streaming multiprocessor 3100. In an embodiment, the shared memory/L1 cache 3118 comprises 128 KB of storage capacity and is in the path from the streaming multiprocessor 3100 to the memory partition unit 3000. The shared memory/L1 cache 3118 can be used to cache reads and writes. One or more of the shared memory/L1 cache 3118, level two cache 3004, and memory 2812 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 3118 enables the shared memory/L1 cache 3118 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 28, are bypassed, creating a much simpler programming model. In the general purpose parallel computation configuration, the work distribution unit 2810 assigns and distributes blocks of threads directly to the data processing cluster 2906 modules. The threads in a block execute the same program, using a unique thread ID in the calculation to ensure each thread generates unique results, using the streaming multiprocessor 3100 to execute the program and perform calculations, shared memory/L1 cache 3118 to communicate between threads, and the load/store unit 3114 to read and write global memory through the shared memory/L1 cache 3118 and the memory partition unit 3000. When configured for general purpose parallel computation, the streaming multiprocessor 3100 can also write commands that the scheduler unit 2808 can use to launch new work on the data processing cluster 2906 modules.

The parallel processing unit 2820 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 2820 is embodied on a single semiconductor substrate. In another embodiment, the parallel processing unit 2820 is included in a system-on-a-chip (SoC) along with one or more other devices such as additional parallel processing unit 2820 modules, the memory 2812, a reduced instruction set computer (RISC) CPU, a memory management unit (MMU), a digital-to-analog converter (DAC), and the like.

In an embodiment, the parallel processing unit 2820 may be included on a graphics card that includes one or more memory devices. The graphics card may be configured to interface with a PCIe slot on a motherboard of a desktop computer. In yet another embodiment, the parallel processing unit 2820 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 32:
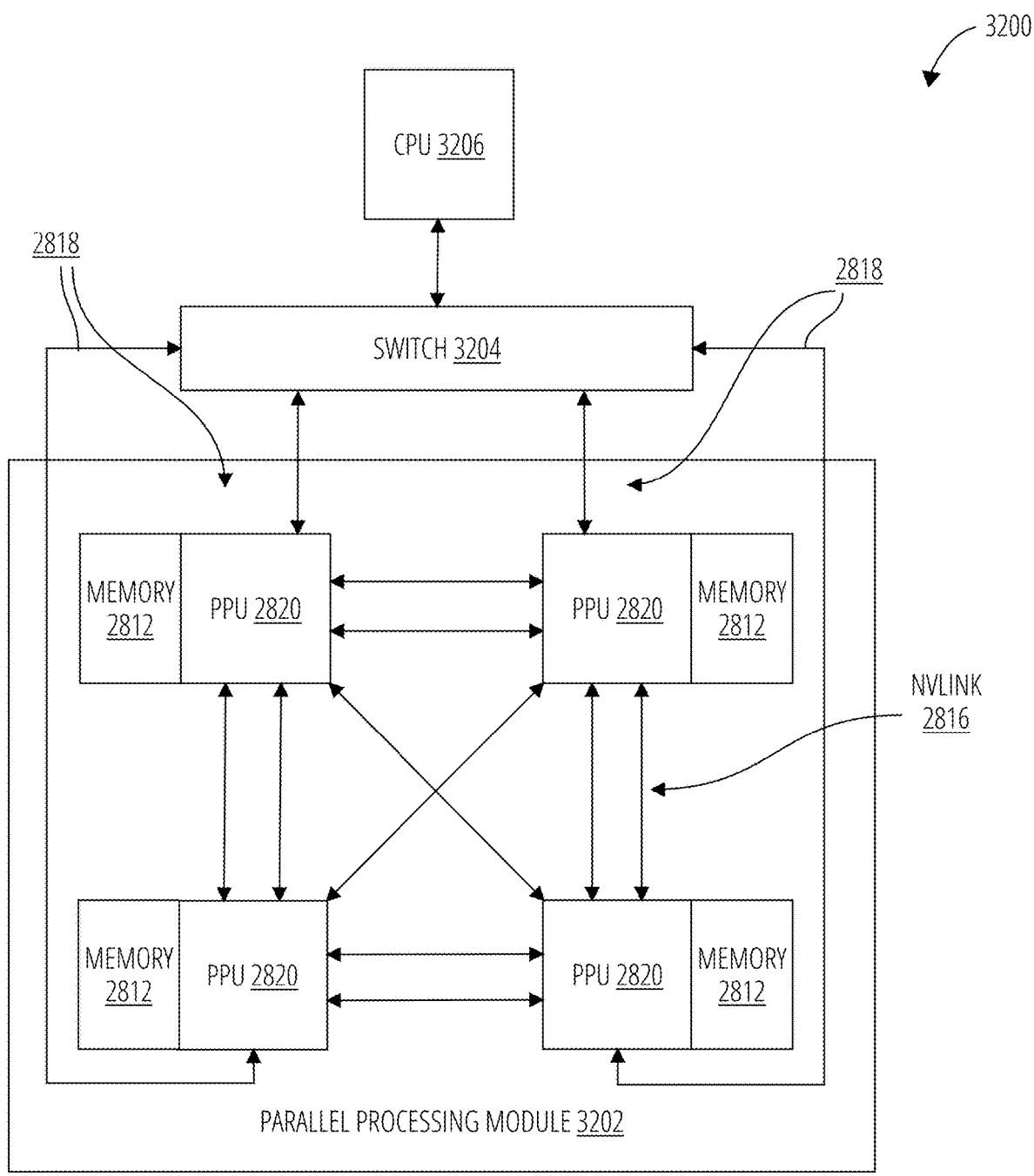
FIG. 32 depicts a processing system 3200 in accordance with one embodiment.

FIG. 32 is a conceptual diagram of a processing system 3200 implemented using the parallel processing unit 2820 of FIG. 28, in accordance with an embodiment. The processing system 3200 includes a central processing unit 3206, switch 3204, and multiple parallel processing unit 2820 modules each and respective memory 2812 modules. The NVLink 2816 provides high-speed communication links between each of the parallel processing unit 2820 modules. Although a particular number of NVLink 2816 and interconnect 2818 connections are illustrated in FIG. 32, the number of connections to each parallel processing unit 2820 and the central processing unit 3206 may vary. The switch 3204 interfaces between the interconnect 2818 and the central processing unit 3206. The parallel processing unit 2820 modules, memory 2812 modules, and NVLink 2816 connections may be situated on a single semiconductor platform to form a parallel processing module 3202. In an embodiment, the switch 3204 supports two or more protocols to interface between various different connections and/or links.

Embodiments of the protocols described herein may be implemented (e.g., in the NVLinks 2816) for communication between the various parallel processing units 2820 and/or between components of the parallel processing module 3202 and the central processing unit 3206 (e.g., in the switch 3204).

In another embodiment (not shown), the NVLink 2816 provides one or more high-speed communication links between each of the parallel processing unit modules (parallel processing unit 2820, parallel processing unit 2820, parallel processing unit 2820, and parallel processing unit 2820) and the central processing unit 3206 and the switch 3204 interfaces between the interconnect 2818 and each of the parallel processing unit modules. The parallel processing unit modules, memory 2812 modules, and interconnect 2818 may be situated on a single semiconductor platform to form a parallel processing module 3202. In yet another embodiment (not shown), the interconnect 2818 provides one or more communication links between each of the parallel processing unit modules and the central processing unit 3206 and the switch 3204 interfaces between each of the parallel processing unit modules using the NVLink 2816 to provide one or more high-speed communication links between the parallel processing unit modules. In another embodiment (not shown), the NVLink 2816 provides one or more high-speed communication links between the parallel processing unit modules and the central processing unit 3206 through the switch 3204. In yet another embodiment (not shown), the interconnect 2818 provides one or more communication links between each of the parallel processing unit modules directly. One or more of the NVLink 2816 high-speed communication links may be implemented as a physical NVLink interconnect or either an on-chip or on-die interconnect using the same protocol as the NVLink 2816.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 3202 may be implemented as a circuit board substrate and each of the parallel processing unit modules and/or memory 2812 modules may be packaged devices. In an embodiment, the central processing unit 3206, switch 3204, and the parallel processing module 3202 are situated on a single semiconductor platform.

In an embodiment, the signaling rate of each NVLink 2816 is 20 to 25 Gigabits/second and each parallel processing unit module includes six NVLink 2816 interfaces (as shown in FIG. 32, five NVLink 2816 interfaces are included for each parallel processing unit module). Each NVLink 2816 provides a data transfer rate of 25 Gigabytes/second in each direction, with six links providing 300 Gigabytes/second. The NVLink 2816 can be used exclusively for PPU-to-PPU communication as shown in FIG. 32, or some combination of PPU-to-PPU and PPU-to-CPU, when the central processing unit 3206 also includes one or more NVLink 2816 interfaces.

In an embodiment, the NVLink 2816 allows direct load/store/atomic access from the central processing unit 3206 to each parallel processing unit module's memory 2812. In an embodiment, the NVLink 2816 supports coherency operations, allowing data read from the memory 2812 modules to be stored in the cache hierarchy of the central processing unit 3206, reducing cache access latency for the central processing unit 3206. In an embodiment, the NVLink 2816 includes support for Address Translation Services (ATS), enabling the parallel processing unit module to directly access page tables within the central processing unit 3206. One or more of the NVLink 2816 may also be configured to operate in a low-power mode.

Figure 33:
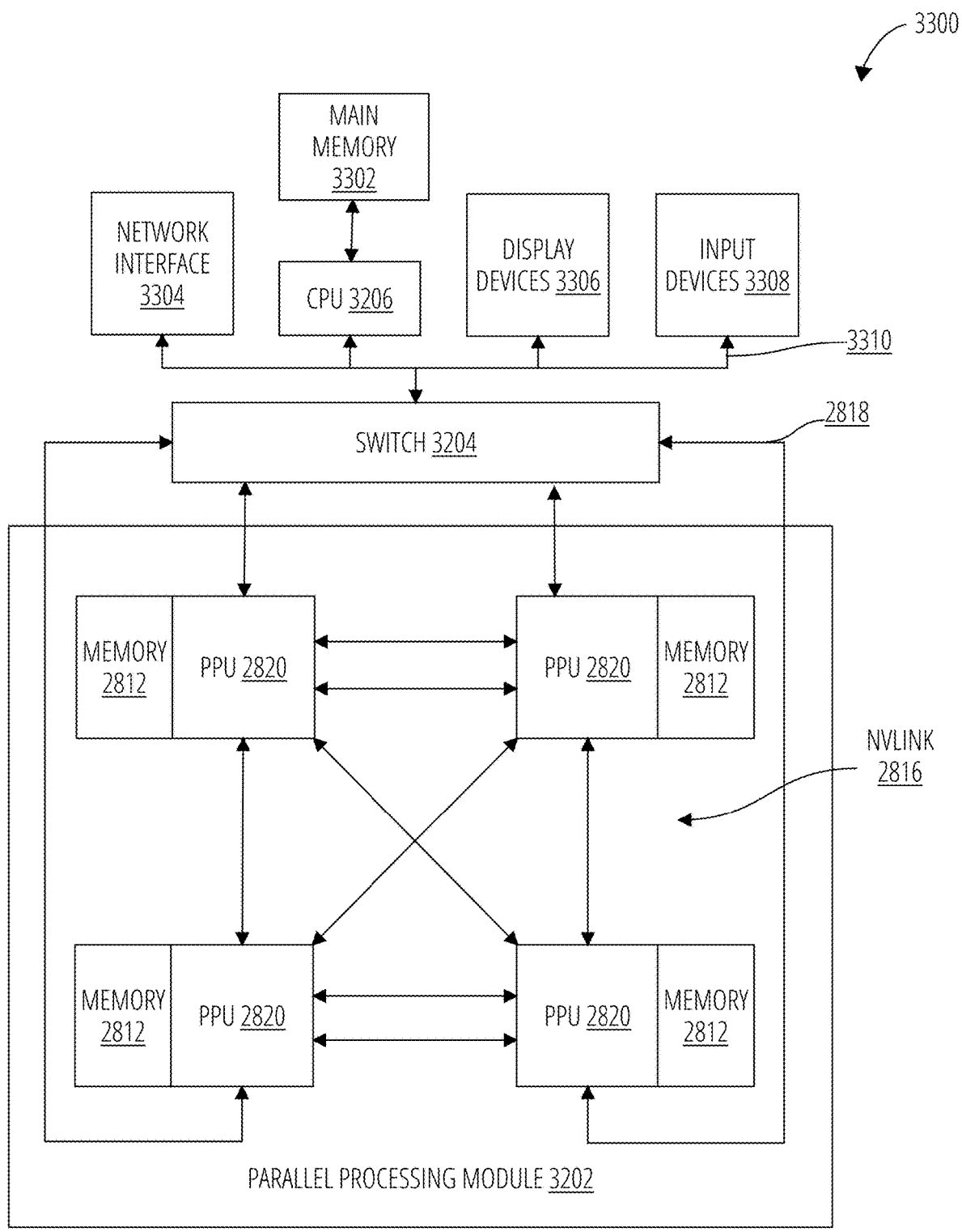
FIG. 33 depicts an exemplary processing system 3300 in accordance with another embodiment.

FIG. 33 depicts an exemplary processing system 3300 in which the various architecture and/or functionality of the various previous embodiments may be implemented. As shown, an exemplary processing system 3300 is provided including at least one central processing unit 3206 that is connected to a communications bus 3310. The communication communications bus 3310 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 3300 also includes a main memory 3302. Control logic (software) and data are stored in the main memory 3302 which may take the form of random access memory (RAM).

The exemplary processing system 3300 also includes input devices 3308, the parallel processing module 3202, and display devices 3306, e.g. a conventional CRT (cathode ray tube), LCD (liquid crystal display), LED (light emitting diode), plasma display or the like. User input may be received from the input devices 3308, e.g., keyboard, mouse, touchpad, microphone, and the like. Each of the foregoing modules and/or devices may even be situated on a single semiconductor platform to form the exemplary processing system 3300. Alternately, the various modules may also be situated separately or in various combinations of semiconductor platforms per the desires of the user.

Further, the exemplary processing system 3300 may be coupled to a network (e.g., a telecommunications network, local area network (LAN), wireless network, wide area network (WAN) such as the Internet, peer-to-peer network, cable network, or the like) through a network interface 3304 for communication purposes.

The exemplary processing system 3300 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 3302 and/or the secondary storage. Such computer programs, when executed, enable the exemplary processing system 3300 to perform various functions. The main memory 3302, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 3300 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

Figure 34:
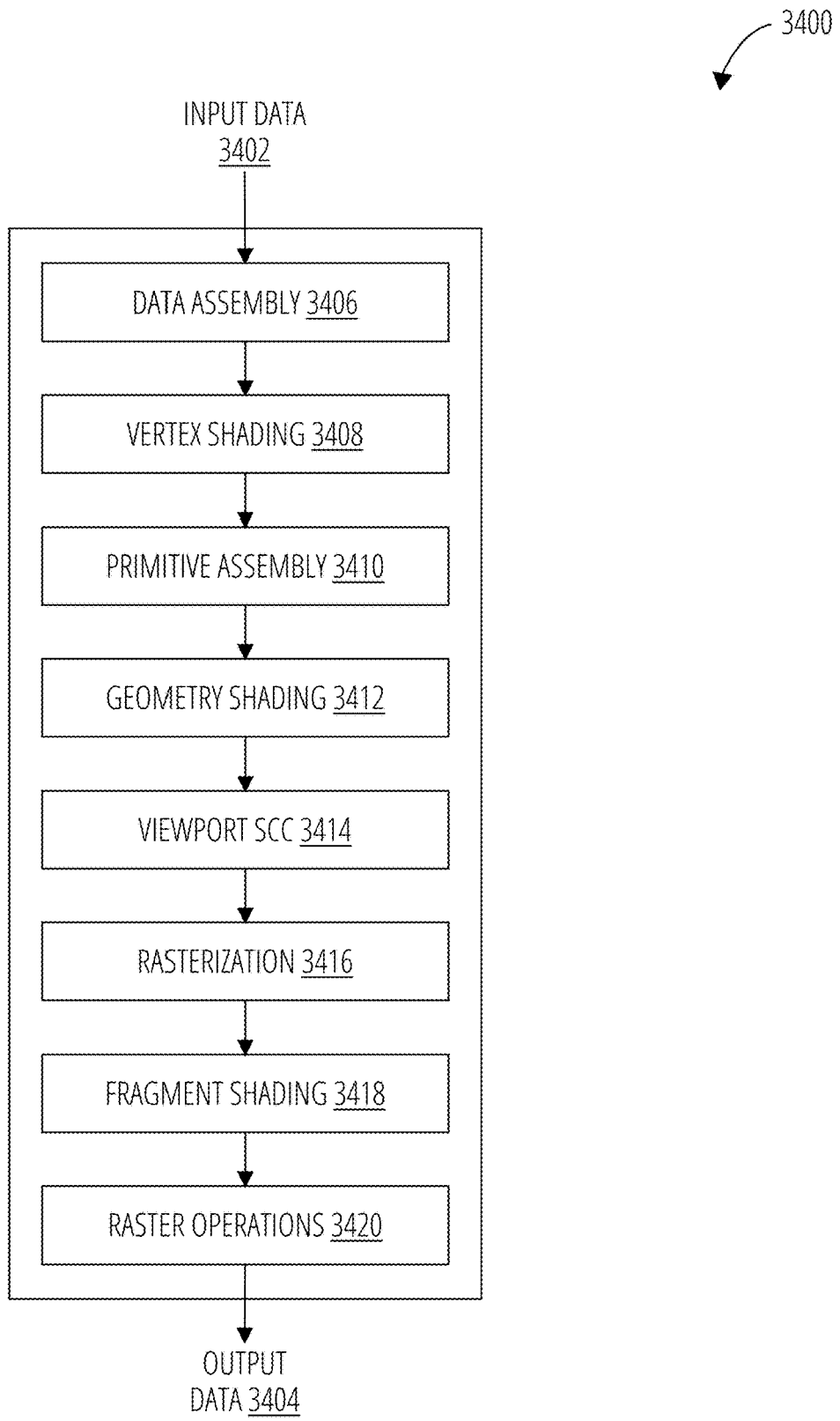
FIG. 34 depicts a graphics processing pipeline 3400 in accordance with one embodiment.

FIG. 34 is a conceptual diagram of a graphics processing pipeline 3400 implemented by the parallel processing unit 2820 of FIG. 28, in accordance with an embodiment. In an embodiment, the parallel processing unit 2820 comprises a graphics processing unit (GPU). The parallel processing unit 2820 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 2820 can be configured to process the graphics primitives to generate a frame buffer (e.g., pixel data for each of the pixels of the display).

An application writes model data for a scene (e.g., a collection of vertices and attributes) to a memory such as a system memory or memory 2812. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 3100 modules of the parallel processing unit 2820 including one or more of a vertex shader, hull shader, domain shader, geometry shader, and a pixel shader. For example, one or more of the streaming multiprocessor 3100 modules may be configured to execute a vertex shader program that processes a number of vertices defined by the model data. In an embodiment, the different streaming multiprocessor 3100 modules may be configured to execute different shader programs concurrently. For example, a first subset of streaming multiprocessor 3100 modules may be configured to execute a vertex shader program while a second subset of streaming multiprocessor 3100 modules may be configured to execute a pixel shader program. The first subset of streaming multiprocessor 3100 modules processes vertex data to produce processed vertex data and writes the processed vertex data to the level two cache 3004 and/or the memory 2812. After the processed vertex data is rasterized (e.g., transformed from three-dimensional data into two-dimensional data in screen space) to produce fragment data, the second subset of streaming multiprocessor 3100 modules executes a pixel shader to produce processed fragment data, which is then blended with other processed fragment data and written to the frame buffer in memory 2812. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 3400 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 3400 receives input data 601 that is transmitted from one stage to the next stage of the graphics processing pipeline 3400 to generate output data 3404. In an embodiment, the graphics processing pipeline 3400 may represent a graphics processing pipeline defined by the OpenGL® API. As an option, the graphics processing pipeline 3400 may be implemented in the context of the functionality and architecture of the previous Figures and/or any subsequent Figure(s).

As shown in FIG. 34, the graphics processing pipeline 3400 comprises a pipeline architecture that includes a number of stages. The stages include, but are not limited to, a data assembly 3406 stage, a vertex shading 3408 stage, a primitive assembly 3410 stage, a geometry shading 3412 stage, a viewport SCC 3414 stage, a rasterization 3416 stage, a fragment shading 3418 stage, and a raster operations 3420 stage. In an embodiment, the input data 3402 comprises commands that configure the processing units to implement the stages of the graphics processing pipeline 3400 and geometric primitives (e.g., points, lines, triangles, quads, triangle strips or fans, etc.) to be processed by the stages. The output data 3404 may comprise pixel data (e.g., color data) that is copied into a frame buffer or other type of surface data structure in a memory.

The data assembly 3406 stage receives the input data 3402 that specifies vertex data for high-order surfaces, primitives, or the like. The data assembly 3406 stage collects the vertex data in a temporary storage or queue, such as by receiving a command from the host processor that includes a pointer to a buffer in memory and reading the vertex data from the buffer. The vertex data is then transmitted to the vertex shading 3408 stage for processing.

The vertex shading 3408 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 3408 stage may manipulate individual vertex attributes such as position, color, texture coordinates, and the like. In other words, the vertex shading 3408 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 3408 stage generates transformed vertex data that is transmitted to the primitive assembly 3410 stage.

The primitive assembly 3410 stage collects vertices output by the vertex shading 3408 stage and groups the vertices into geometric primitives for processing by the geometry shading 3412 stage. For example, the primitive assembly 3410 stage may be configured to group every three consecutive vertices as a geometric primitive (e.g., a triangle) for transmission to the geometry shading 3412 stage. In some embodiments, specific vertices may be reused for consecutive geometric primitives (e.g., two consecutive triangles in a triangle strip may share two vertices). The primitive assembly 3410 stage transmits geometric primitives (e.g., a collection of associated vertices) to the geometry shading 3412 stage.

The geometry shading 3412 stage processes geometric primitives by performing a set of operations (e.g., a geometry shader or program) on the geometric primitives. Tessellation operations may generate one or more geometric primitives from each geometric primitive. In other words, the geometry shading 3412 stage may subdivide each geometric primitive into a finer mesh of two or more geometric primitives for processing by the rest of the graphics processing pipeline 3400. The geometry shading 3412 stage transmits geometric primitives to the viewport SCC 3414 stage.

In an embodiment, the graphics processing pipeline 3400 may operate within a streaming multiprocessor and the vertex shading 3408 stage, the primitive assembly 3410 stage, the geometry shading 3412 stage, the fragment shading 3418 stage, and/or hardware/software associated therewith, may sequentially perform processing operations. Once the sequential processing operations are complete, in an embodiment, the viewport SCC 3414 stage may utilize the data. In an embodiment, primitive data processed by one or more of the stages in the graphics processing pipeline 3400 may be written to a cache (e.g. L1 cache, a vertex cache, etc.). In this case, in an embodiment, the viewport SCC 3414 stage may access the data in the cache. In an embodiment, the viewport SCC 3414 stage and the rasterization 3416 stage are implemented as fixed function circuitry.

The viewport SCC 3414 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 3416 stage.

The rasterization 3416 stage converts the 3D geometric primitives into 2D fragments (e.g. capable of being utilized for display, etc.). The rasterization 3416 stage may be configured to utilize the vertices of the geometric primitives to setup a set of plane equations from which various attributes can be interpolated. The rasterization 3416 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 3416 stage generates fragment data (e.g., interpolated vertex attributes associated with a particular sample location for each covered pixel) that are transmitted to the fragment shading 3418 stage.

The fragment shading 3418 stage processes fragment data by performing a set of operations (e.g., a fragment shader or a program) on each of the fragments. The fragment shading 3418 stage may generate pixel data (e.g., color values) for the fragment such as by performing lighting operations or sampling texture maps using interpolated texture coordinates for the fragment. The fragment shading 3418 stage generates pixel data that is transmitted to the raster operations 3420 stage.

The raster operations 3420 stage may perform various operations on the pixel data such as performing alpha tests, stencil tests, and blending the pixel data with other pixel data corresponding to other fragments associated with the pixel. When the raster operations 3420 stage has finished processing the pixel data (e.g., the output data 3404), the pixel data may be written to a render target such as a frame buffer, a color buffer, or the like.

It will be appreciated that one or more additional stages may be included in the graphics processing pipeline 3400 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 3412 stage). Other types of graphics processing pipelines are contemplated as being within the scope of the present disclosure. Furthermore, any of the stages of the graphics processing pipeline 3400 may be implemented by one or more dedicated hardware units within a graphics processor such as parallel processing unit 2820. Other stages of the graphics processing pipeline 3400 may be implemented by programmable hardware units such as the streaming multiprocessor 3100 of the parallel processing unit 2820.

The graphics processing pipeline 3400 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 2820. The API provides an abstraction for a programmer that lets a programmer utilize specialized graphics hardware, such as the parallel processing unit 2820, to generate the graphical data without requiring the programmer to utilize the specific instruction set for the parallel processing unit 2820. The application may include an API call that is routed to the device driver for the parallel processing unit 2820. The device driver interprets the API call and performs various operations to respond to the API call. In some instances, the device driver may perform operations by executing instructions on the CPU. In other instances, the device driver may perform operations, at least in part, by launching operations on the parallel processing unit 2820 utilizing an input/output interface between the CPU and the parallel processing unit 2820. In an embodiment, the device driver is configured to implement the graphics processing pipeline 3400 utilizing the hardware of the parallel processing unit 2820.

Various programs may be executed within the parallel processing unit 2820 in order to implement the various stages of the graphics processing pipeline 3400. For example, the device driver may launch a kernel on the parallel processing unit 2820 to perform the vertex shading 3408 stage on one streaming multiprocessor 3100 (or multiple streaming multiprocessor 3100 modules). The device driver (or the initial kernel executed by the parallel processing unit 2820) may also launch other kernels on the parallel processing unit 2820 to perform other stages of the graphics processing pipeline 3400, such as the geometry shading 3412 stage and the fragment shading 3418 stage. In addition, some of the stages of the graphics processing pipeline 3400 may be implemented on fixed unit hardware such as a rasterizer or a data assembler implemented within the parallel processing unit 2820. It will be appreciated that results from one kernel may be processed by one or more intervening fixed function hardware units before being processed by a subsequent kernel on a streaming multiprocessor 3100.

Figure 35:
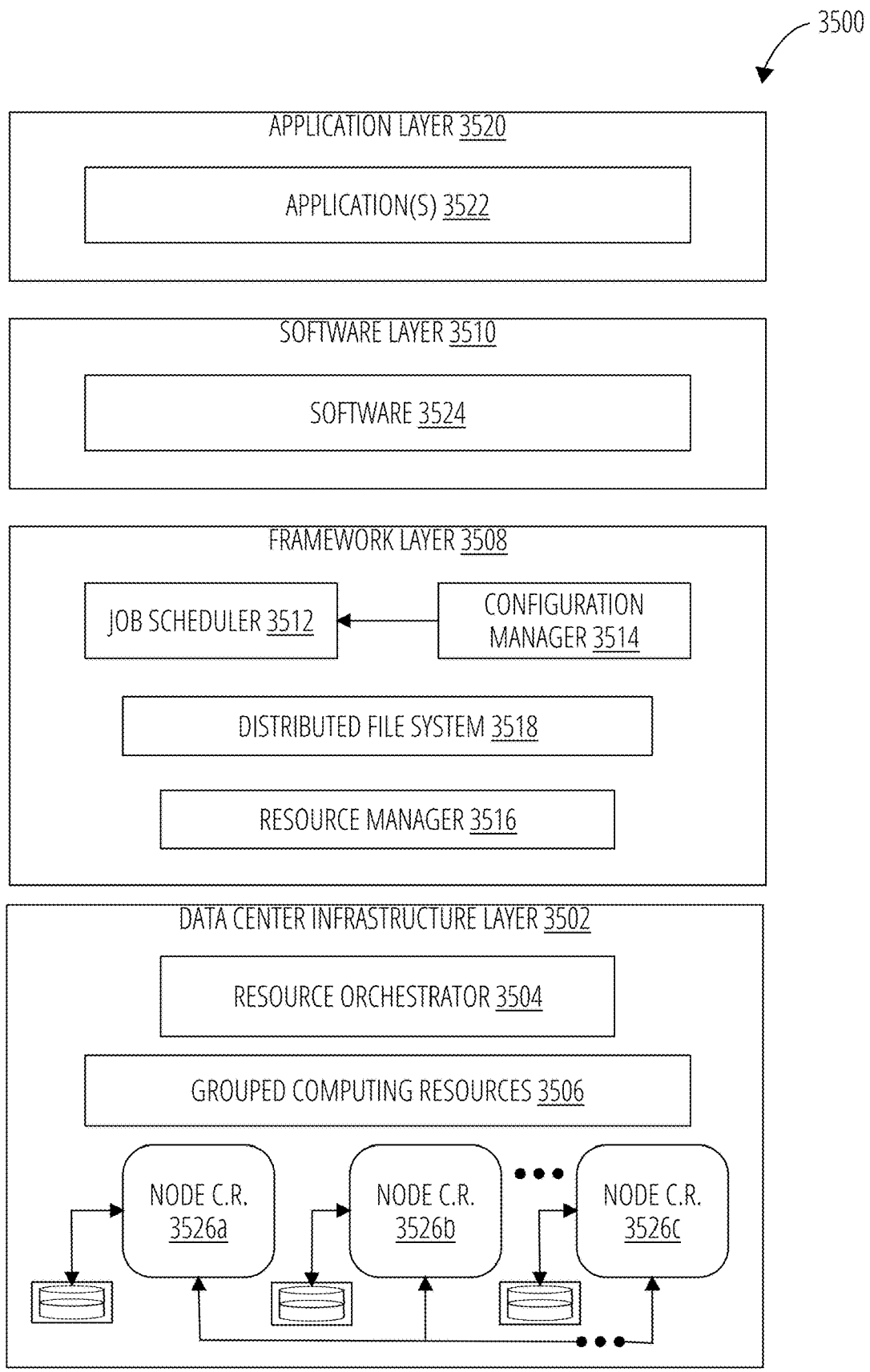
FIG. 35 depicts a data center 3500 in accordance with one embodiment.

FIG. 35 depicts an exemplary data center 3500, in accordance with at least one embodiment. In at least one embodiment, data center 3500 includes, without limitation, a data center infrastructure layer 3502, a framework layer 3508, software layer 3510, and an application layer 3520.

In at least one embodiment, as depicted in FIG. 35, data center infrastructure layer 3502 may include a resource orchestrator 3504, grouped computing resources 3506, and node computing resources ("node C.R.s") Node C.R. 3526a, Node C.R. 3526b, Node C.R. 3526c, . . . node C.R. N), where "N" represents any whole, positive integer. In at least one embodiment, node C.R.s may include, but are not limited to, any number of central processing units ("CPUs") or other processors (including accelerators, field programmable gate arrays ("FPGAs"), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s may be a server having one or more of above-mentioned computing resources.

Embodiments of the protocols described herein may be implemented for communication between the various node computing resources, for example.

In at least one embodiment, grouped computing resources 3506 may include separate groupings of node C.R.s housed within one or more racks (not shown), or many racks housed in data centers at various geographical locations (also not shown). Separate groupings of node C.R.s within grouped computing resources 3506 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 3504 may configure or otherwise control one or more node C.R.s and/or grouped computing resources 3506. In at least one embodiment, resource orchestrator 3504 may include a software design infrastructure ("SDI") management entity for data center 3500. In at least one embodiment, resource orchestrator 3504 may include hardware, software or some combination thereof.

In at least one embodiment, as depicted in FIG. 35, framework layer 3508 includes, without limitation, a job scheduler 3512, a configuration manager 3514, a resource manager 3516, and a distributed file system 3518. In at least one embodiment, framework layer 3508 may include a framework to support software 3524 of software layer 3510 and/or one or more application(s) 3522 of application layer 220. In at least one embodiment, software 3524 or application(s) 3522 may respectively include web-based service software or applications, such as those provided by Amazon Web Services, Google Cloud and Microsoft Azure. In at least one embodiment, framework layer 3508 may be, but is not limited to, a type of free and open-source software web application framework such as Apache Spark™ (hereinafter "Spark") that may utilize a distributed file system 3518 for large-scale data processing (e.g., "big data"). In at least one embodiment, job scheduler 3512 may include a Spark driver to facilitate scheduling of workloads supported by various layers of data center 3500. In at least one embodiment, configuration manager 3514 may be capable of configuring different layers such as software layer 3510 and framework layer 3508, including Spark and distributed file system 3518 for supporting large-scale data processing. In at least one embodiment, resource manager 3516 may be capable of managing clustered or grouped computing resources mapped to or allocated for support of distributed file system 3518 and distributed file system 3518. In at least one embodiment, clustered or grouped computing resources may include grouped computing resources 3506 at data center infrastructure layer 3502. In at least one embodiment, resource manager 3516 may coordinate with resource orchestrator 3504 to manage these mapped or allocated computing resources.

In at least one embodiment, software 3524 included in software layer 3510 may include software used by at least portions of node C.R.s, grouped computing resources 3506, and/or distributed file system 3518 of framework layer 3508. One or more types of software may include, but are not limited to, Internet web page search software, e-mail virus scan software, database software, and streaming video content software.

In at least one embodiment, application(s) 3522 included in application layer 3520 may include one or more types of applications used by at least portions of node C.R.s, grouped computing resources 3506, and/or distributed file system 3518 of framework layer 3508. In at least one or more types of applications may include, without limitation, CUDA applications, 5G network applications, artificial intelligence application, data center applications, and/or variations thereof.

In at least one embodiment, any of configuration manager 3514, resource manager 3516, and resource orchestrator 3504 may implement any number and type of self-modifying actions based on any amount and type of data acquired in any technically feasible fashion. In at least one embodiment, self-modifying actions may relieve a data center operator of data center 3500 from making possibly bad configuration decisions and possibly avoiding underutilized and/or poor performing portions of a data center.

LISTING OF DRAWING ELEMENTS 100 packet-based communication system
102 source node
104 re-transmission buffer
106 flow states
108 same address filter
110 shared memory
112 shared memory
114 history filter
116 flow states
118 replay buffer
120 response reorder buffer
122 request reorder buffer
124 destination node
126 source switch
128 switch
130 destination switch
202 network
2702 block
2704 block
2706 block
2802 I/O unit
2804 front-end unit
2806 hub
2808 scheduler unit
2810 work distribution unit
2812 memory
2814 crossbar
2816 NVLink
2818 interconnect
2820 parallel processing unit
2900 general processing cluster
2902 pipeline manager
2904 pre-raster operations unit
2906 data processing cluster
2908 raster engine
2910 M-pipe controller
2912 primitive engine
2914 work distribution crossbar
2916 memory management unit
3000 memory partition unit
3002 raster operations unit
3004 level two cache
3006 memory interface
3100 streaming multiprocessor
3102 instruction cache
3104 scheduler unit
3106 dispatch
3108 register file
3110 core
3112 special function unit
3114 load/store unit
3116 interconnect network
3118 shared memory/L1 cache
3200 processing system
3202 parallel processing module
3204 switch
3206 central processing unit
3300 exemplary processing system
3302 main memory
3304 network interface
3306 display devices
3308 input devices
3310 communications bus
3400 graphics processing pipeline
3402 input data
3404 output data
3406 data assembly
3408 vertex shading
3410 primitive assembly
3412 geometry shading
3414 viewport SCC
3416 rasterization
3418 fragment shading
3420 raster operations
3500 data center
3502 data center infrastructure layer
3504 resource orchestrator
3506 grouped computing resources
3508 framework layer
3510 software layer
3512 job scheduler
3514 configuration manager
3516 resource manager
3518 distributed file system 3520 application layer
3522 application(s)
3524 software
3526a node C.R.
3526b node C.R.
3526c node C.R.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A transceiver for an unreliable and unordered switched packet network, the transceiver comprising:
   a transmitter;
   a receiver coupled to the transmitter over the switched packet network;

logic to:
at the transmitter, determine a first condition of whether a dependency exists between an un-transmitted packet and one or more already transmitted and outstanding packets;
at the transmitter, on condition that the first condition is satisfied, mark the un-transmitted packet with a same identifier and a next sequence number as the one or more outstanding packets; and
at the receiver, determine a second condition of whether a second packet is received comprising the same identifier and a different sequence numbers as a previously received packet; and
at the receiver, on condition that the second condition is satisfied, establish a packet flow with the transmitter.

2. The transceiver of claim 1, the receiver comprising logic to forward packets of the packet flow in an order defined by the sequence numbers of the packets.

3. The transceiver of claim 1, wherein the dependency comprises the un-transmitted packet having a same memory access address as is specified by the one or more already transmitted and outstanding memory packets.

4. The transceiver of claim 1, further comprising logic to:
on condition that the first condition is satisfied, transmit the un-transmitted packet to the receiver over a fast path of the switched packet network.

5. The transceiver of claim 1, the receiver further comprising logic to:
utilize a transaction id of the previously received packet and the second packet as an identifier of the packet flow.

6. The transceiver of claim 1, further comprising logic to:
execute a go-back operation to re-synchronize the transmitter and the receiver in response to an error in the packet flow.

7. The transceiver of claim 1, further comprising logic to:
establish the packet flow in response to receipt of the previously received packet and the second packet, without an explicit handshake between the transmitter and the receiver to establish the packet flow.

8. The transceiver of claim 1, further comprising logic to:
forward memory load command response packets in order to a memory of a processor that is an original source of the corresponding memory load command packets, in response to a failed execution of a memory load command packet.

9. The transceiver of claim 1, further comprising logic to:
detect, at the transmitter, multiple response packets to a same request packet sent to the receiver; and
forward only a most-recently received one of the multiple response packets to a memory of a processor coupled to the transmitter.

10. A method of establishing a packet flow in an unreliable and unordered switched packet network, the method comprising:
determining at a transmitter that an unsent memory access packet to transmit specifies access to a same memory address as is specified by an outstanding memory access packet, and as a result marking the unsent memory access packet with a same transaction id as, and a later sequence number than, the outstanding memory access packet; and
at a receiver, detecting that a recorded packet and a second packet received after the recorded packet have a same transaction id but different sequence numbers, and as a result to establish the packet flow by assigning the recorded packet and the second packet to a same packet flow.

11. The method of claim 10, wherein a further result of determining at the transmitter that the unsent memory access packet to transmit specifies access to the same memory address as is specified by the outstanding memory access packet is transmitting the unsent memory access packet to the receiver with a higher priority than a priority at which the outstanding memory access packet was transmitted.

12. The method of claim 10, further comprising:
the establishing the packet flow based only on receipt of the recorded packet and the second packet, without executing an explicit handshake to establish the packet flow between the transmitter and the receiver prior to sending either packet.

13. The method of claim 10, further comprising:
serializing in the packet flow the transmission of memory load command packets and memory store command packets that specify the same memory address.

14. The method of claim 10, further comprising:
as a result of issuance of a failed memory load command packet, re-executing memory load operations for memory load command packets subsequent to the failed memory load command by forwarding memory load command response packets in order.

15. A method of establishing a packet flow between a transmitter and a receiver in an unreliable and unordered switched packet network, the method comprising:
communicating from the transmitter to the receiver, with a first priority, a first packet of the packet flow;
communicating from the transmitter to the receiver, with a second priority higher than the first priority, a second packet of the packet flow;
subsequent to the second packet, communicating from the transmitter to the receiver, with the first priority, additional packets of the packet flow; and
upon and as a result of receiving the second packet at the receiver, establishing the existence of the packet flow at the receiver, such that the additional packets of the packet flow are identified as belonging to the packet flow.

16. The method of claim 15, wherein the packet flow is established without a handshake process between the transmitter and the receiver.

17. The method of claim 15, further comprising:
the packet flow comprising a serialization of memory load command packets followed by memory store command packets in the packet flow.

18. The method of claim 15, further comprising:
tracking packets with a history filter in the receiver.

19. The method of claim 15, further comprising:
tracking packets with a same address filter in the transmitter.

20. The method of claim 15, further comprising:
executing a go-back mechanism in response to errors in the packet flow.

21. The method of claim 15, wherein the packet flow is established without a request from the transmitter to the receiver to communicate packets at the second priority.

22. A method of establishing a packet flow between a transmitter and a receiver in an unreliable and unordered switched packet network, the method comprising:
communicating from the transmitter to the receiver, with a first priority, an initial packet of the packet flow;

communicating from the transmitter to the receiver, with a second priority higher than the first priority, a next packet of the packet flow following the initial packet;

subsequent to the next packet, communicating from the transmitter to the receiver, with the first priority, additional packets of the packet flow; and upon and as a result of receiving the next packet at the receiver, establishing the existence of the packet flow at the receiver, such that the additional packets of the packet flow are identified as belonging to the packet flow to establish.

\* \* \* \* \*